(12) United States Patent
Scott et al.

(10) Patent No.: US 10,311,267 B2
(45) Date of Patent: Jun. 4, 2019

(54) BEACON TRACKING THROUGHOUT AN EVENT AREA

(71) Applicant: Maritz Holdings Inc., Fenton, MO (US)

(72) Inventors: Brian Keith Scott, Frederick, MD (US); Jeffrey Allan Moore, Walkersville, MD (US); Michael Edward Godsey, Frederick, MD (US)

(73) Assignee: Maritz Holdings Inc., Fenton, MO (US)

( * ) Notice: Subject to any disclaimer, the term of this patent is extended or adjusted under 35 U.S.C. 154(b) by 0 days.

(21) Appl. No.: 15/804,687

(22) Filed: Nov. 6, 2017

(65) Prior Publication Data

US 2018/0150662 A1 May 31, 2018

Related U.S. Application Data

(60) Provisional application No. 62/428,214, filed on Nov. 30, 2016, provisional application No. 62/466,214, filed on Mar. 2, 2017.

(51) Int. Cl.
| | |
|---|---|
| *G01S 5/02* | (2010.01) |
| *G06K 7/10* | (2006.01) |
| *G06K 7/14* | (2006.01) |
| *G06K 19/06* | (2006.01) |
| *G06Q 10/10* | (2012.01) |
| *G06Q 50/28* | (2012.01) |

(52) U.S. Cl.
CPC ............ *G06K 7/10366* (2013.01); *G01S 5/02* (2013.01); *G06K 7/1413* (2013.01); *G06K 7/1417* (2013.01); *G06K 19/06028* (2013.01); *G06K 19/06037* (2013.01); *G06Q 10/1093* (2013.01); *G06Q 50/28* (2013.01)

(58) Field of Classification Search
CPC ............ G06K 7/10366; G06K 7/1413; G06K 19/06037; G06K 19/06028; G06K 7/1417; G01S 5/00; G01S 5/02; G06Q 10/00; G06Q 10/1093; G06Q 50/28
See application file for complete search history.

(56) References Cited

U.S. PATENT DOCUMENTS

| | | | | |
|---|---|---|---|---|
| 2016/0364819 | A1* | 12/2016 | Salimi | G06Q 50/205 |
| 2017/0169688 | A1* | 6/2017 | Britt | G08B 21/0205 |
| 2018/0075375 | A1* | 3/2018 | Becker | G06Q 10/06 |

OTHER PUBLICATIONS

Ramsey Faragher and Robert Harle, An Analysis of the Accuracy of Bluetooth Low Energy for Indoor Positioning Applications, Proceedings of the 27th International Technical Meeting of the Satellite Division of the Institute of Navigation (ION GNSS+'14), Sep. 2014, pp. 201-210.

* cited by examiner

*Primary Examiner* — Sonji N Johnson
(74) *Attorney, Agent, or Firm* — Stinson Leonard Street LLP

(57) ABSTRACT

Tracking beacons throughout an event area by a network of mobile computing devices distributed throughout the event area. In an embodiment, location and time data of the beacons is transformed into behavioral data representing the location of an associated event attendee through the event area during a period of time.

20 Claims, 35 Drawing Sheets

BEACON TRACKING THROUGHOUT AN EVENT AREA

CROSS-REFERENCE TO RELATED APPLICATIONS

This application claims priority to U.S. Provisional Patent Application Ser. No. 62/428,214, filed Nov. 30, 2016, and U.S. Provisional Patent Application Ser. No. 62/466,214, filed Mar. 2, 2017. The entire contents of the above-identified applications are expressly incorporated herein by reference, including the contents and teachings of any references contained therein.

TECHNICAL FIELD

Aspects of the present invention generally relate to the field of hardware beacon devices that transmit electromagnetic energy to a network of mobile computing devices.

BACKGROUND

Behavioral data regarding locations of event attendees throughout an event area provides important insights for event exhibitors and event area operators. Conventional techniques include event exhibitors merely scanning a barcode printed on a name badge of an event attendee. But this technique fails to provide sufficient data, such as data about the length of time the event attendee visited the exhibitor, event attendees who passed by the exhibitor but did not stop, and the like. Moreover, conventional techniques based on radio-frequency identification (RFID) devices are impractical due to human body interference with the signal, deployment costs of reader devices, and the like.

Conventional beacon-based techniques, such as Bluetooth beacons, also have shortcomings. For example, conventional beacon systems include beacon devices located at locations throughout an event area, such as at exhibitor booths, session rooms, and common areas (e.g., lobbies, etc.). These systems rely on event attendees carrying mobile computing devices (e.g., smartphones, tablet computing devices, etc.) that execute an application for receiving the electromagnetic radiation emitted by the beacons. The executing applications on the event attendee mobile devices then upload the data to server computing devices in a cloud environment. Shortcomings of this technique include reliance on event attendees to download and run the application and the subsequent reduced battery life of attendee mobile computing devices. Moreover, the application executing on event attendee mobile devices may present security risks to the device and/or collected data.

SUMMARY

Aspects of the disclosure relate to tracking beacons integrated with name badges by a network of mobile computing devices distributed throughout an event area. By associating a unique beacon identifier with an event attendee, aspects of the disclosure provide behavioral and demographic data about event attendees. Utilizing a network of existing mobile computing devices reduces cost and reliance on proprietary hardware devices.

A system embodying aspects of the disclosure includes a badge, a beacon, mobile computing devices, and a server computing device. The badge is configured to be worn by an event attendee. The beacon is integrated into the badge and associated with the event attendee. The beacon is configured to emit an electromagnetic radiation signal including a unique identifier that identifies the event attendee associated with the beacon. The mobile computing devices are distributed throughout an event area and each one is configured to receive the electromagnetic radiation signal emitted by the beacon when the beacon is proximate the devices. Each mobile computing device includes an associated reader identifier identifying the mobile computing device. Each mobile computing device is also configured, by an executing application, to extract the unique identifier from the received electromagnetic radiation signal and generate location and time data representing the location of the badge relative to the location of the mobile computing device. The server computing device is communicatively coupled to the mobile computing devices via a communications network. A processor of the server computing device is configured to receive the extracted unique identifier, the generated location and time data, and the reader identifier from the mobile computing devices via the communications network. The processor is also configured to store the received data in a computer-readable storage device as behavioral data representing the location of the badge throughout the event area during a period of time.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
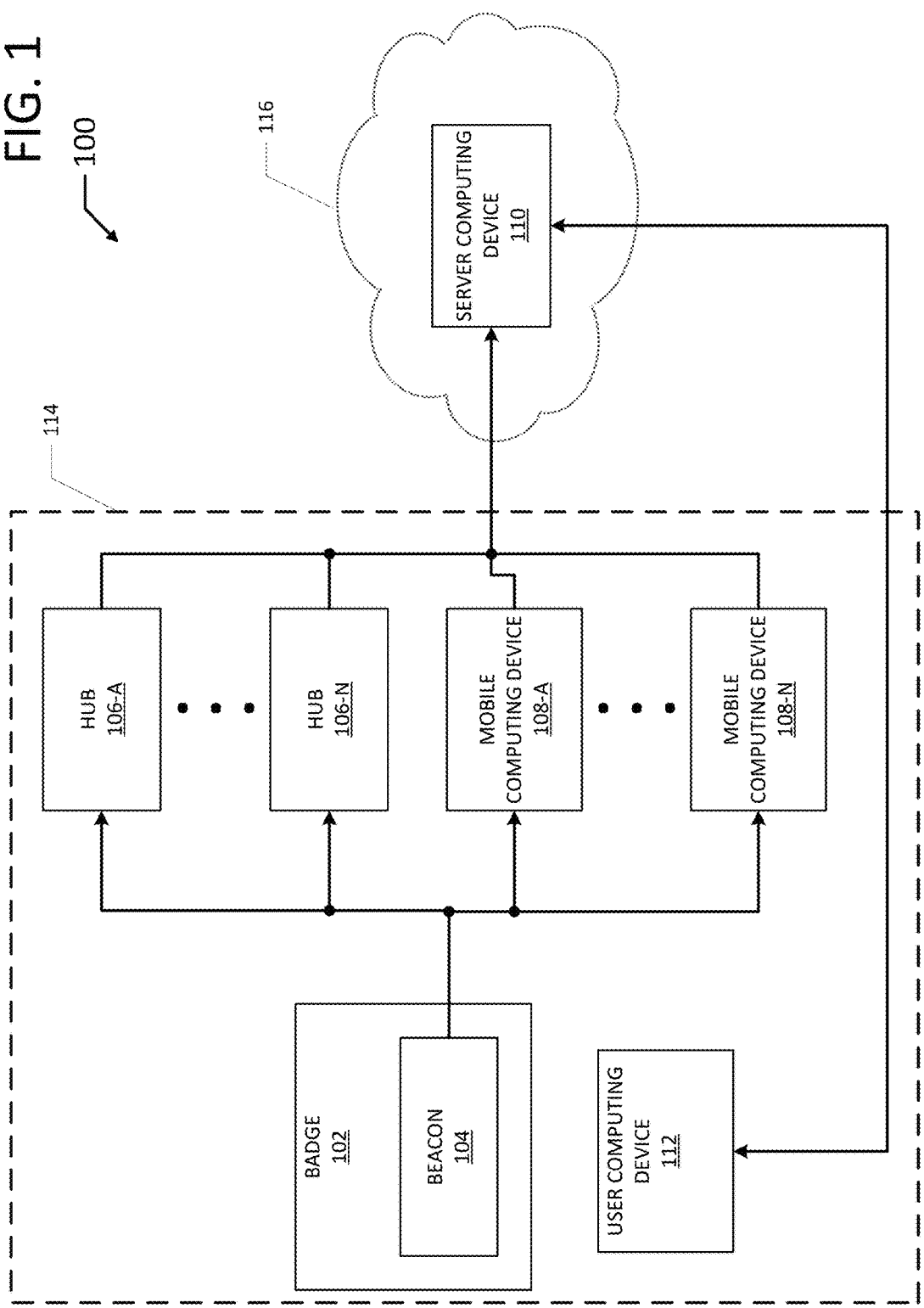
FIG. 1 illustrates an exemplary beacon tracking system and process according to an embodiment.

FIG. 1 illustrates an exemplary beacon tracking system and process, generally indicated at 100, in accordance with an aspect of the disclosure. The system 100 includes a badge 102, a beacon 104, hubs 106, mobile computing devices 108, a server computing device 110, and a user computing device 112. In an embodiment, the badge 102, the beacon 104, the hubs 106, the mobile computing devices 108, and the user computing device 112 are located within an event area 114, such as a trade show, a convention, and the like. In another embodiment, the server computing device 110 comprises a cloud computing environment 116.

In accordance with an aspect of the disclosure, beacon 104 is communicatively coupled to hubs 106 and/or mobile computing devices 108 by emission of an electromagnetic radiation signal from beacon 104 that is received by hubs 106 and/or mobile computing devices 108. In an embodiment, the electromagnetic radiation signal comprises a Bluetooth low energy signal operating in a range of about 2.400 GHz to about 2.4835 GHz. In an embodiment, the electromagnetic radiation signal may be any signal that facilitates the exchange of data, such as those that operate according to the IEEE 802.15 wireless personal area network standards, for example.

The hubs 106 and mobile computing devices 108 are communicatively coupled to server computing device 110 and/or cloud computing environment 116 via a communications infrastructure. Moreover, the server computing device 110 and cloud computing environment 116 are communicatively coupled to the user computing device 112 via the communications infrastructure. The communications infrastructure (e.g., communications network) is capable of facilitating the exchange of data among various components of system 100. The communications infrastructure may include a local area network (LAN) that is connectable to other telecommunications networks, including other LANs or portions of the Internet or an intranet. The communications infrastructure may also be any telecommunications network that facilitates the exchange of data, such as cellular networks and/or those that operate according to the IEEE 802.3 (e.g., Ethernet) and/or the IEEE 802.11 (e.g., Wi-Fi) protocols, for example. In other embodiments, the communications infrastructure is any medium that allows data to be physically transferred through serial or parallel communication channels (e.g., copper wire, optical fiber, computer bus, wireless communication channel, etc.).

The badge 102 is adapted to provide identification information regarding an event attendee. In an embodiment, badge 102 includes a receptacle, such as a plastic sleeve, to receive a name label. For example, the name label may include printed textual information and/or a scannable code (e.g., barcode, QR code) identifying the event attendee. The badge 102 is also configured to be worn by the event attendee, such as by a lanyard or a clip attached to badge 102.

The beacon 104 is integrated into badge 102 and adapted to emit electromagnetic radiation that includes a unique identifier identifying the event attendee. For example, beacon 104 may be inside a plastic sleeve of badge 102, manufactured into badge 102, applied to badge 102 with an adhesive material, and the like. In an embodiment, beacon 104 emits electromagnetic radiation in accordance with the iBeacon protocol. The packets transmitted by beacon 104 in accordance with an iBeacon protocol include a Universally Unique Identifier (UUID) parameter, a Major parameter, and a Minor parameter. In an embodiment, the UUID parameter transmitted by every beacon 104 is the same and the combination of the values of the Major and Minor parameters is what uniquely identifies the beacon 104 (and thus the attendee associated with the beacon) at the event. The Major parameter transmitted by beacons 104 use values 1-10 in a ratio that maximizes the chance of triggering a region enter event or region exit event without saturating any one area of the event area 114. In an aspect, the event area 114 may become saturated with all ten Majors and enter and exit events from the beacons 104 may not keep mobile computing devices 108 operating an iOS operating system awake and ranging. In the event of such a saturation of beacons 104 emitting the same Major value, mobile computing devices 108 operating an Android operating system transmit a wake-up signal as further described herein. The Minor parameter transmitted by beacons 104 may be any value from 1-65,535 and is randomly assigned. The combination of the values of the Major and Minor parameters enables the beacon tracking system and process 100 to support up to 655,350 attendees each assigned a beacon 104.

Exemplary properties of beacon 104 include:
iBeacon Name: eventBit
Size: 36 mm×23 mm×3.3 mm or smaller
Battery: CR2016
Protocol: iBeacon
UUID: 23E93F28-8B8B-45AA-A916-D68765B70982
Major: 1-10
Minor: 1-65,535 (randomly assigned)

In an embodiment, hubs 106 each include a mobile computing device 108, as further described herein. The mobile computing devices 108 and hubs 106 are adapted to receive the electromagnetic radiation signals, including unique beacon identifier data, emitted by beacon 104. In an embodiment, mobile computing devices 108 include at least one processor and computer-readable storage media for storing processor-executable instructions that comprise a real-time beacon tracking application, as further described herein. In one form, the executing application extracts the unique beacon identifier data from the electromagnetic radiation signal and generates location and time data representing the location of beacon 104 relative to the location of hub 106 and/or mobile computing device 108. Details regarding the generation of location and time data are further described herein. In an embodiment, each mobile computing device 108 and/or hub 106 has an associated reader identifier that is used to uniquely identify the mobile computing device and/or hub. The hubs 106 and/or mobile computing devices 108 may be referred to as readers herein, in accordance with one or more embodiments of the present disclosure.

The server computing device 110 is adapted to receive the extracted unique beacon identifier, the generated location and time data, and/or the reader identifier from hubs 106 and/or mobile computing devices 108 via the communications infrastructure. In an embodiment, server computing device 110 includes a processor and computer-readable storage media for storing processor-executable instructions and a database. In an embodiment, the database stores the received unique beacon identifier data, location data, time data, and/or reader identifier data. For example, by assigning hubs 106 and/or mobile computing devices 108 to locations on a map (e.g., event center map), the server computing device 110 determines the location of beacon 104 by its proximity to the hub 106 and/or mobile computing device 108. In another embodiment, the processor-executable instructions comprise an application configured to transform the beacon identifier data, location data, time data, and/or reader identifier data into behavioral data representing the location of beacon 104, and by extension badge 102 and the event attendee, throughout event area 114 during a period of time. In an aspect, server computing device 110 handles processing of all raw data into aggregated and reported data. By handing this processing off to server computing device 110 rather than consuming computing resources on mobile computing devices 108, aspects of the present disclosure conserver computing resources and battery levels of the mobile computing devices 108 and enable the mobile computing devices 108 to perform longer, more frequent beacon reading operations.

Figure 26:
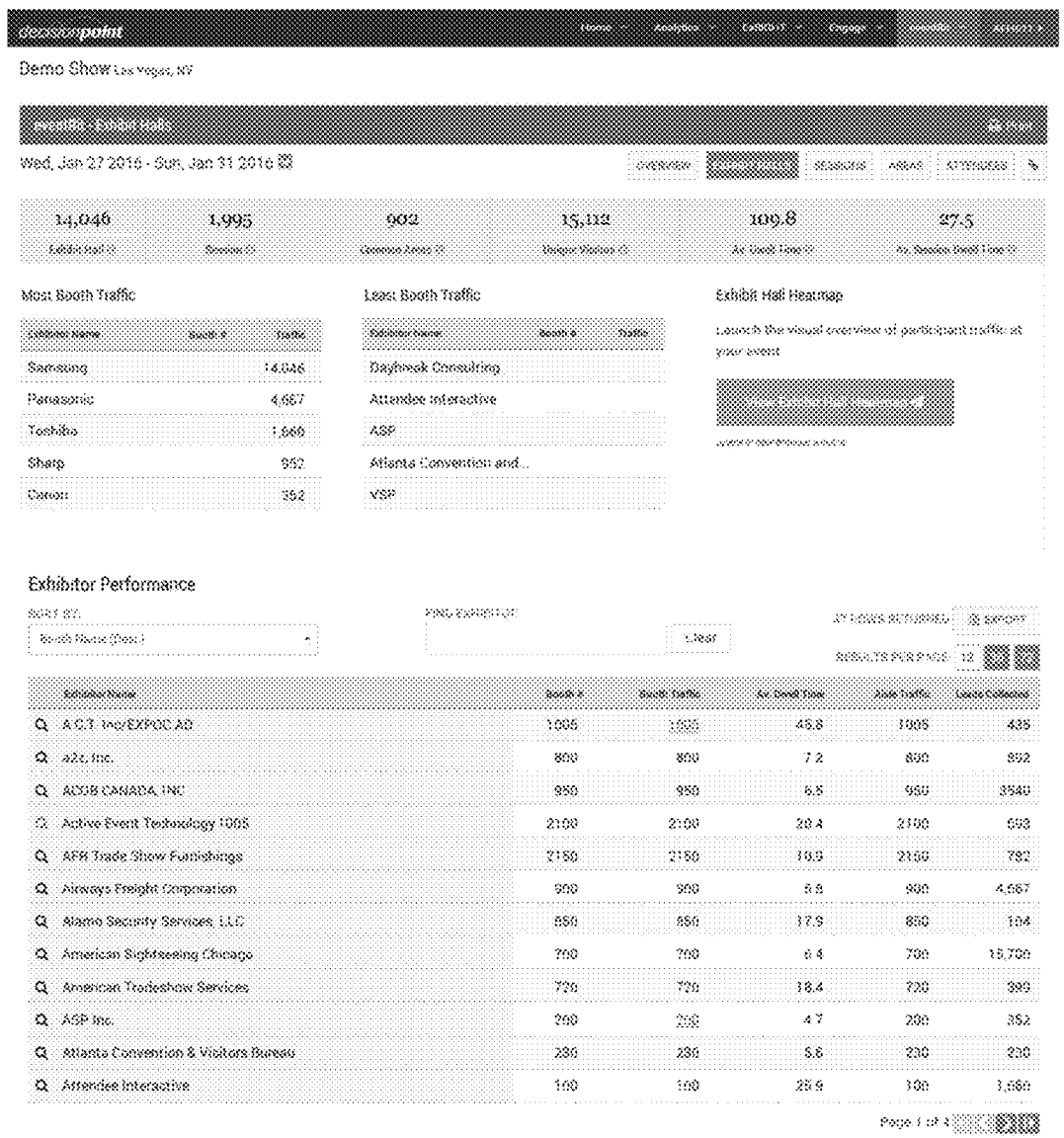
FIGS. 26-35 illustrate exemplary screenshots of event attendee identification, demographic, and behavioral data according to an embodiment.
Figure 27:
Figure 28:
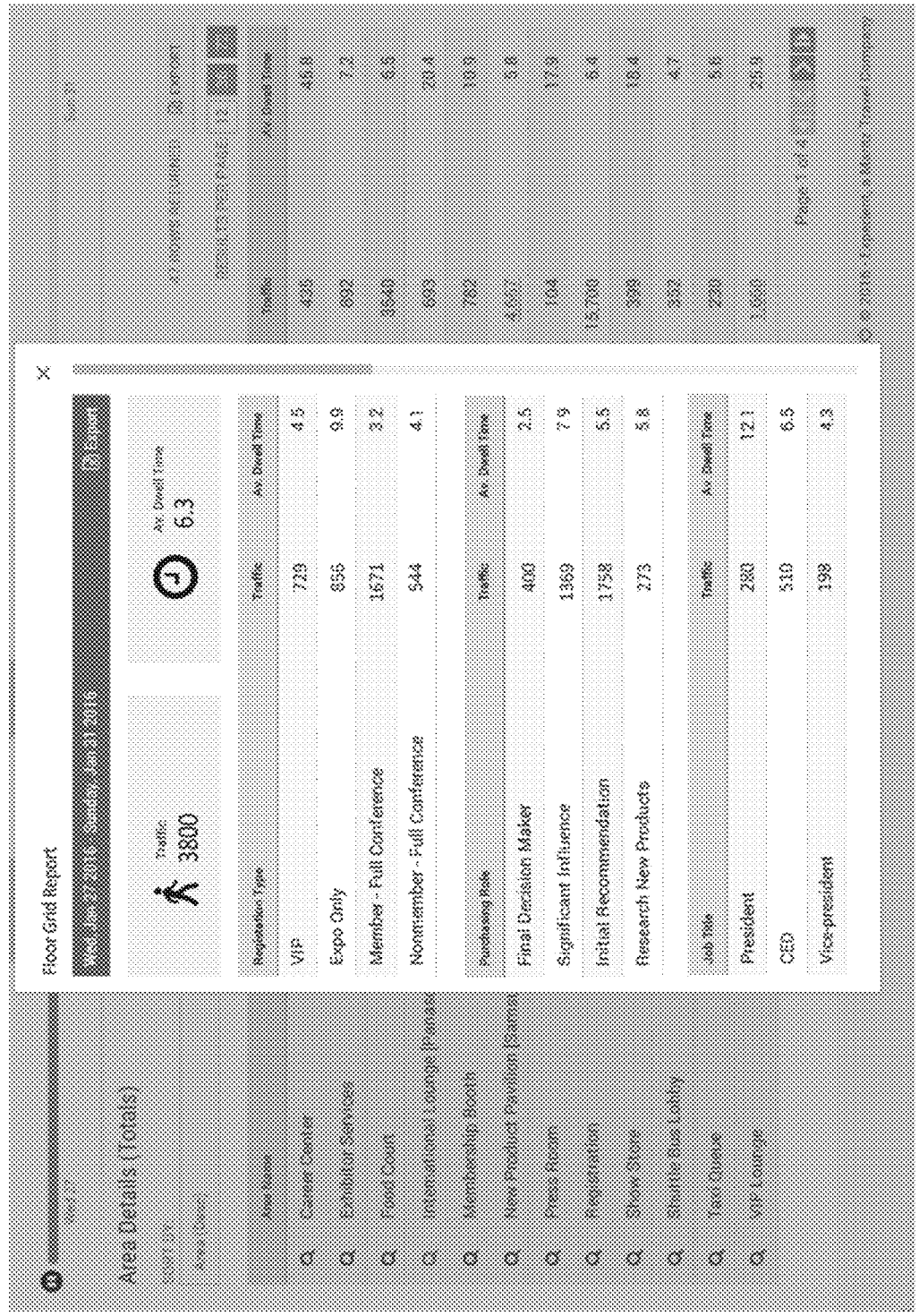
Figure 29:
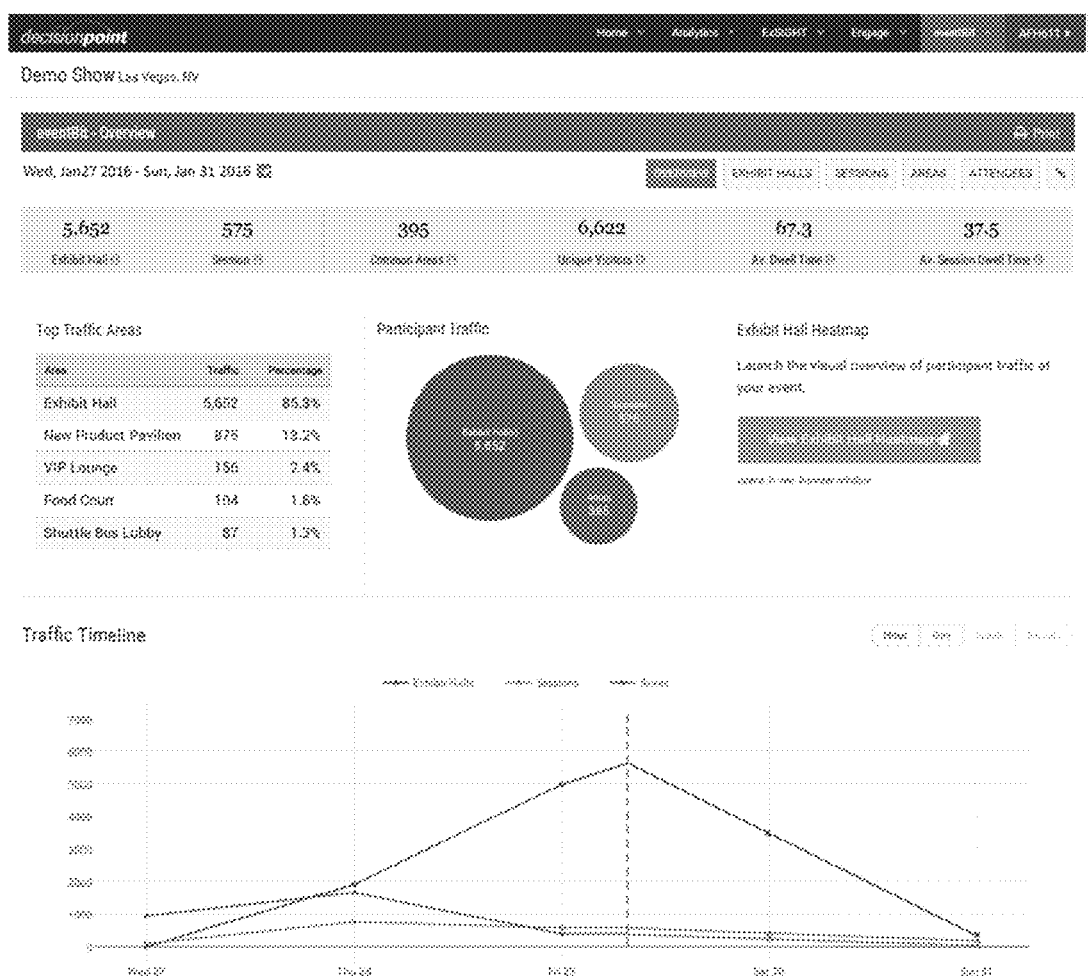
Figure 30:
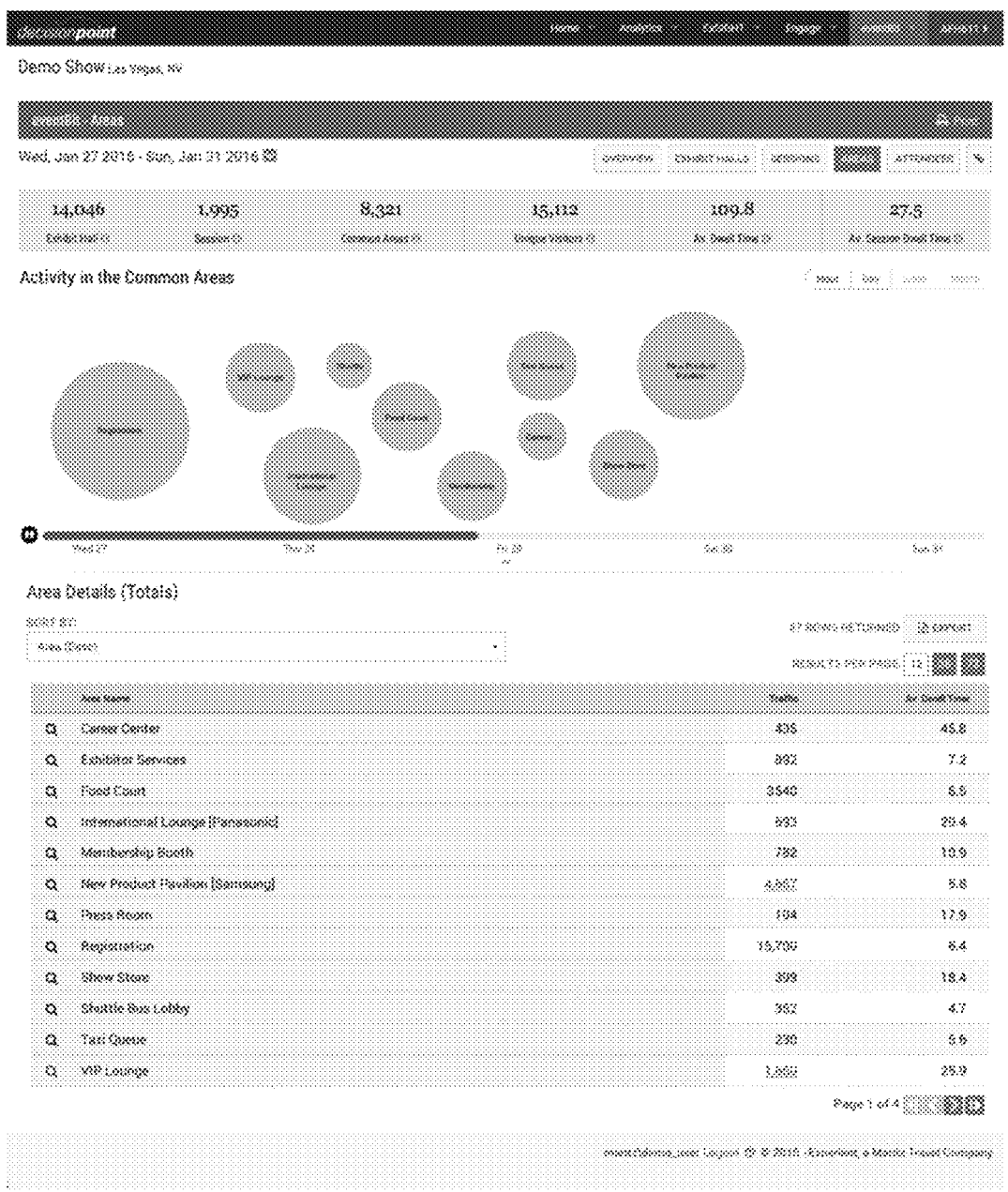
Figure 31:
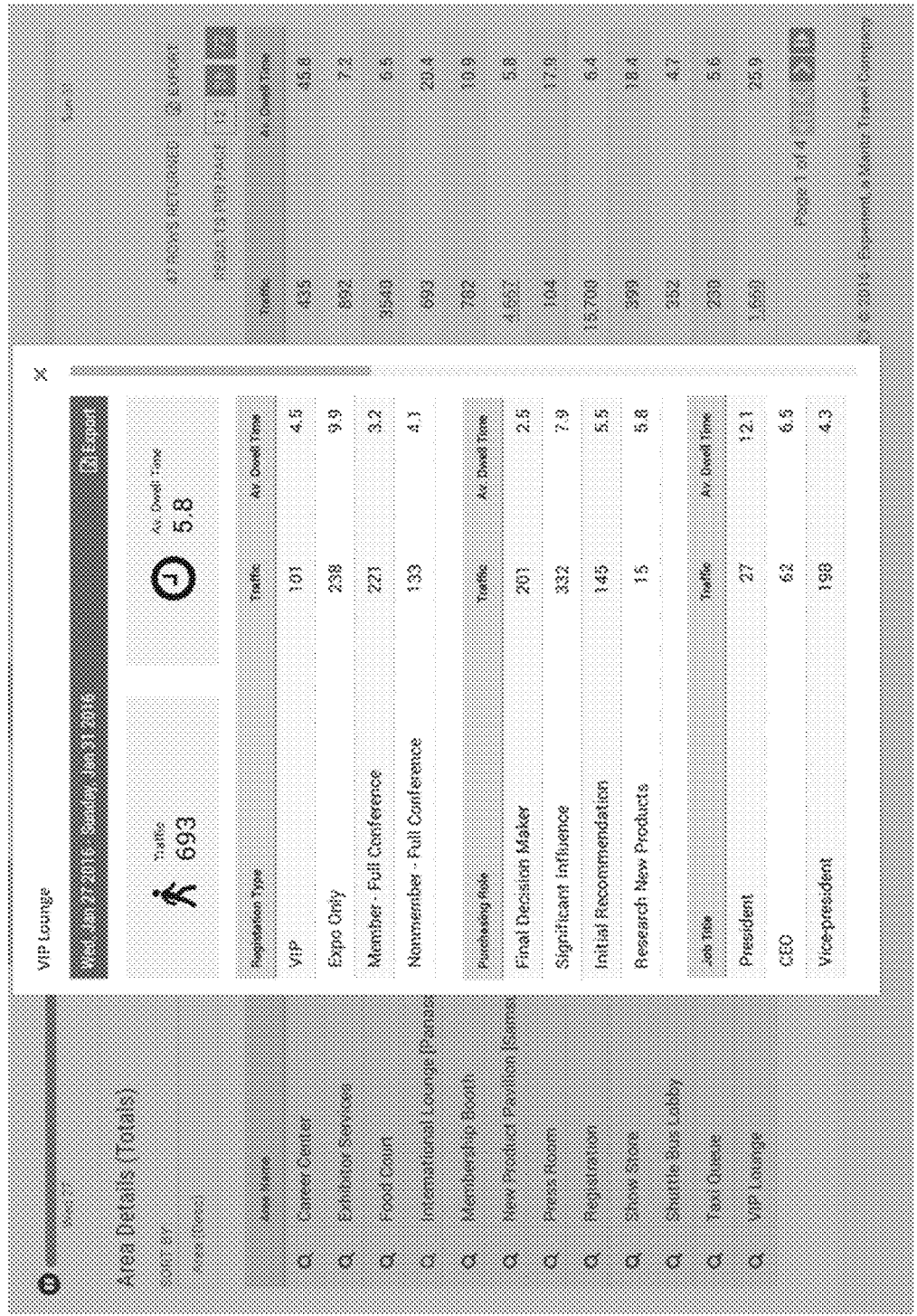
Figure 32:
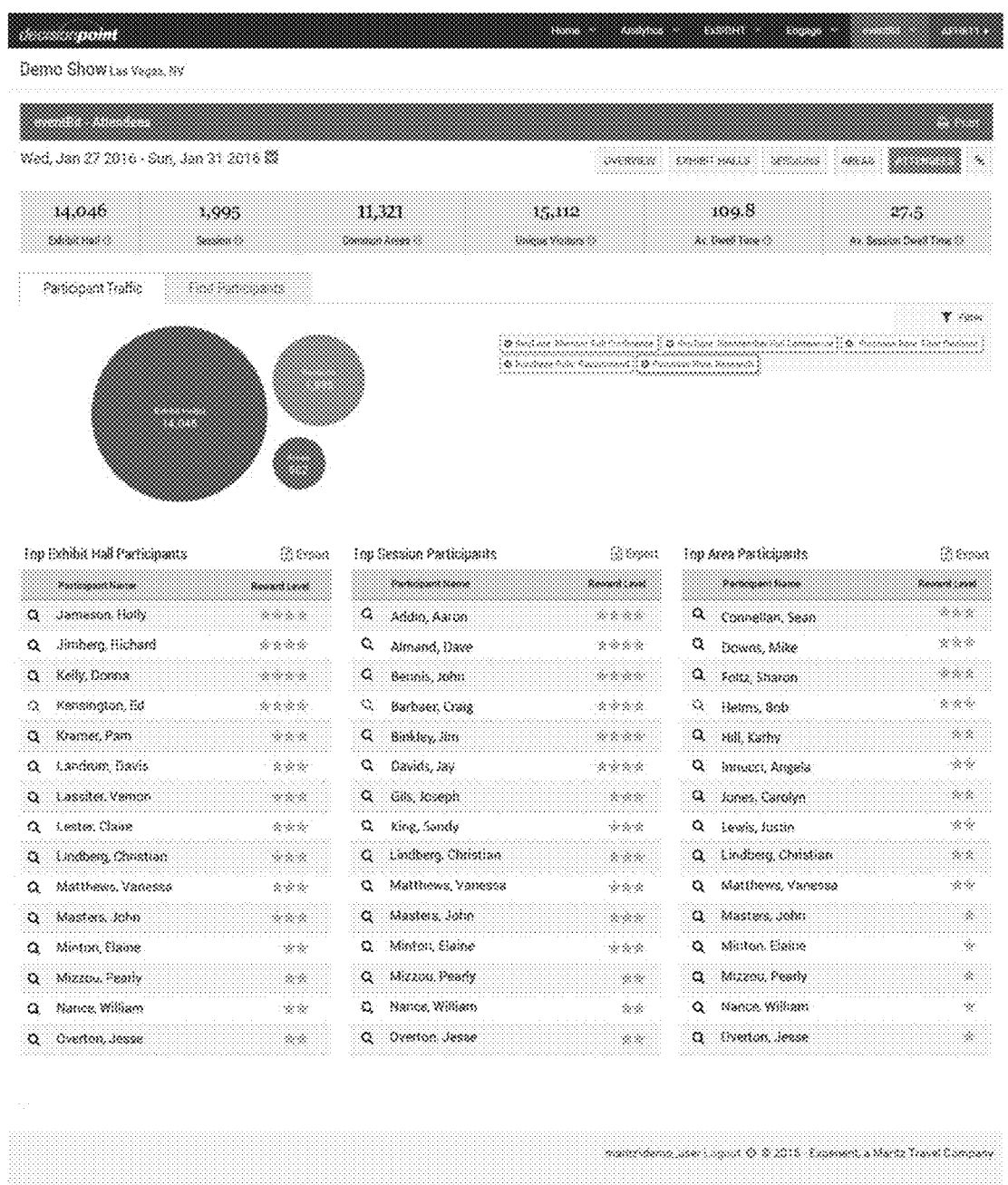
Figure 33:
Figure 34:
Figure 35:
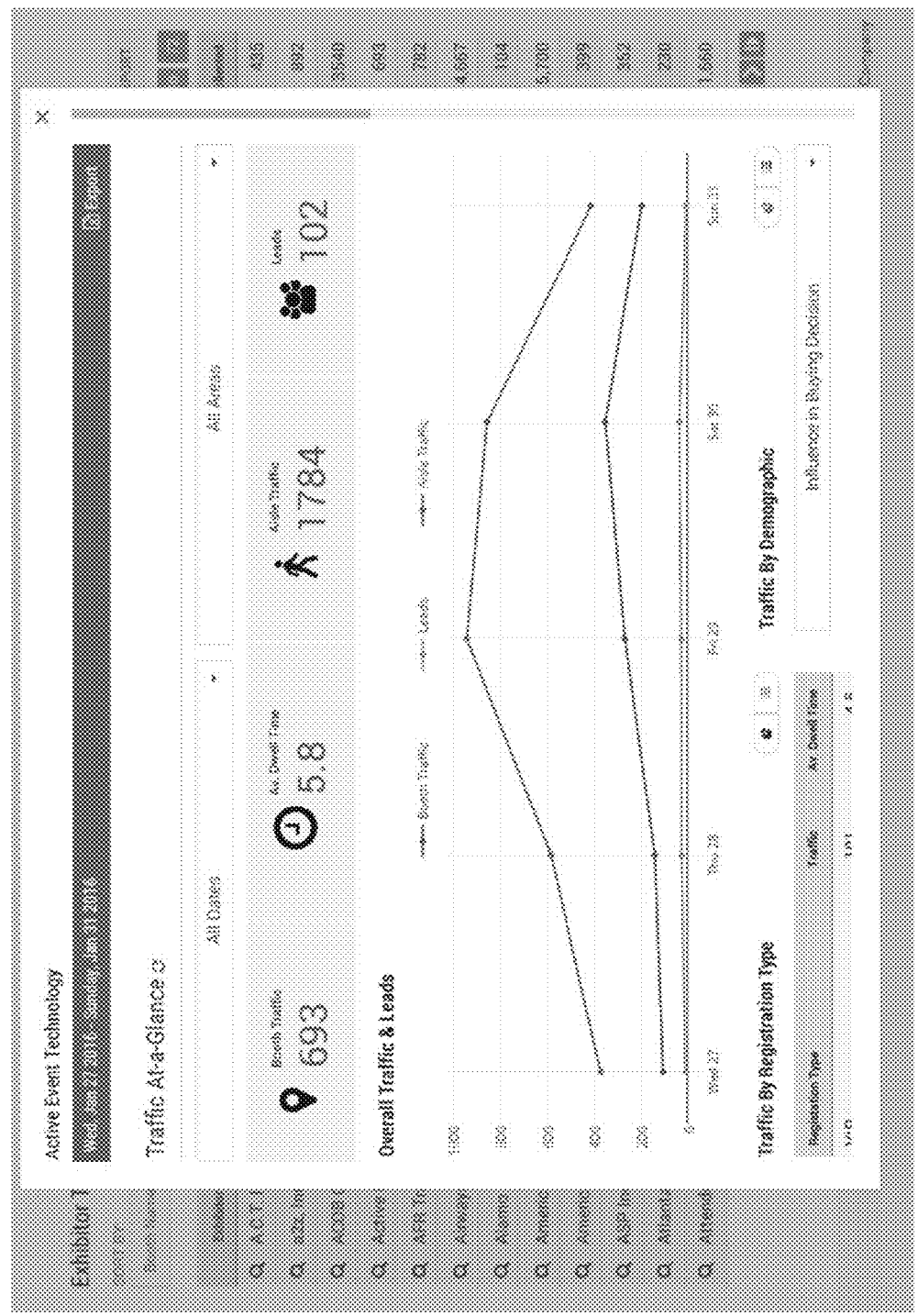
Figure 36:
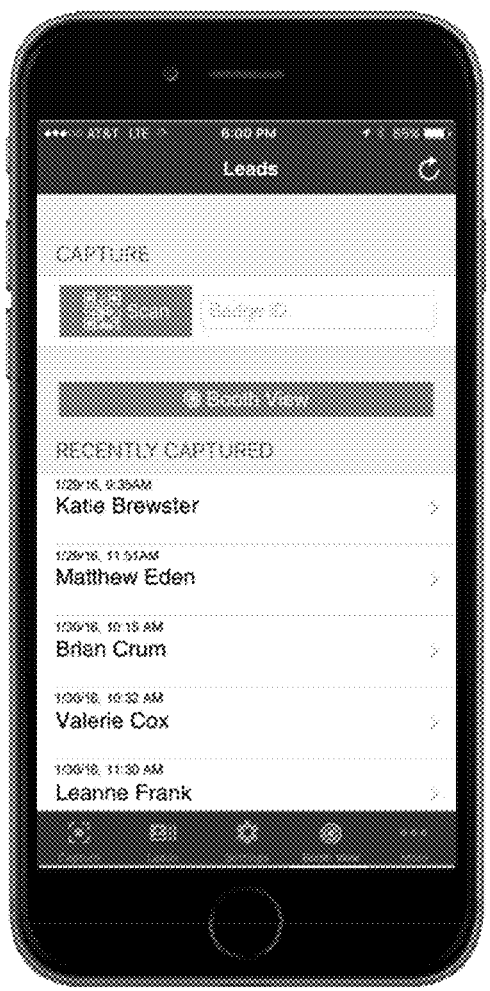
FIGS. 36-39 illustrate exemplary screenshots of a beacon tracking application according to an embodiment.
Figure 37:
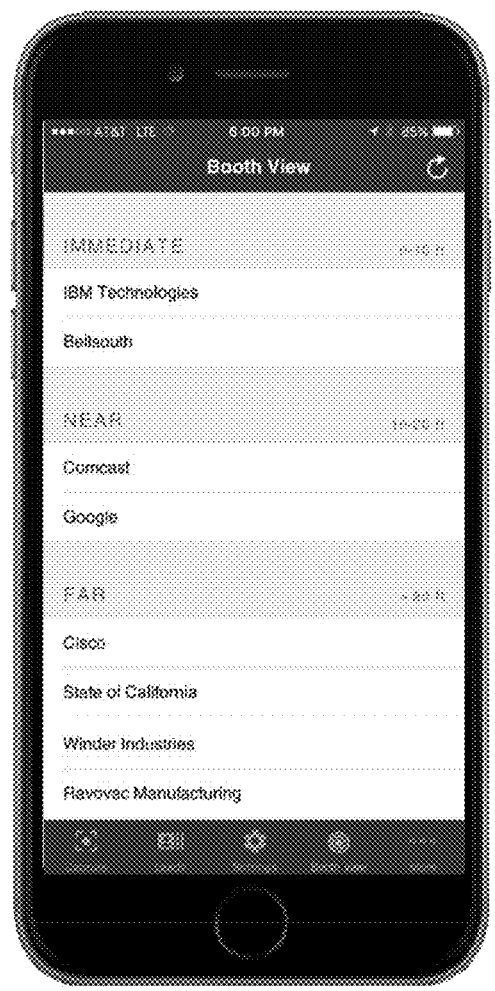

In one form, aspects of beacon tracking system and process 100 enable the generation and storage of data regarding event attendee demographics. For example, this data may be displayed (e.g., via mobile computing devices 108, user computing device 112, etc.) and sorted by demographics including, but not limited to, job title, industry, and the like (see e.g., FIGS. 27, 28, 31, and 34). In another form, aspects of beacon tracking system and process 100 enable the generation and storage of data regarding overall event attendee traffic at exhibitor booths (see e.g., FIGS. 26, 27, 29, 32, 33, and 34) and/or common areas (see e.g., FIGS. 30, 32, and 33). For example, all event attendees who enter the booth area wearing a badge 102 with integrated beacon 104 are counted by hubs 106 and/or mobile computing devices 108 and can be displayed by adjustable time intervals. In yet another form, aspects of beacon tracking system and process 100 enable the generation and storage of data regarding event attendee traffic in aisles between exhibitor booths, which may be displayed by adjustable time intervals (see e.g., FIGS. 26, 27, 28, and 34). In a further form, aspects of beacon tracking system and process 100 enable the generation and storage of data regarding a length of time an event attendee wearing a beacon 104 visited a certain event exhibitor booth (see e.g., FIGS. 26, 28, and 34). This data may be displayed by adjustable time intervals. In another form, aspects of beacon tracking system and process 100 enable the generation and storage of data regarding overall event attendee traffic and leads comparisons, which may be displayed as a graph comparing aisle traffic vs. booth traffic vs. leads scanned (see e.g., FIGS. 27, 34, and 35). In yet another form, aspects of beacon tracking system and process 100 enable mobile computing devices 108 to display company names associated with event attendees wearing a beacon 104 within a predetermined distance of the mobile computing device (see e.g., FIGS. 37 and 38). In another form, aspects of beacon tracking system and process 100 enable reporting of dwell time, demographic breakdown, lead comparison in adjustable time intervals, and/or nearby foot traffic (see e.g., FIGS. 26, 27, 36, and 37).

Figure 38:
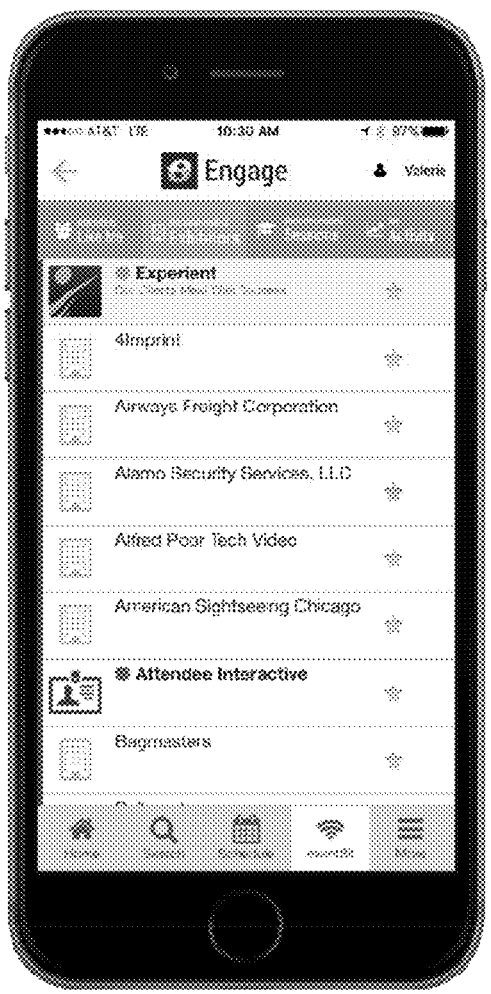
Figure 39:
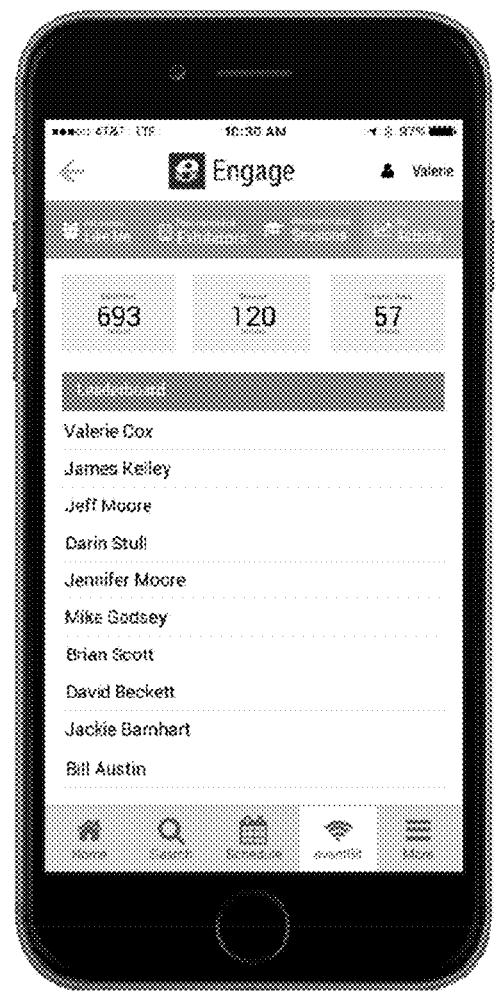

In an embodiment, user computing device 112 is adapted to display the names of exhibitors within the event area 114 (see FIG. 38). In another embodiment, user computing device 112 is adapted to display activity of the event attendee associated with badge 102 and beacon 104 (see FIG. 39).

Hub Devices

Figure 2:
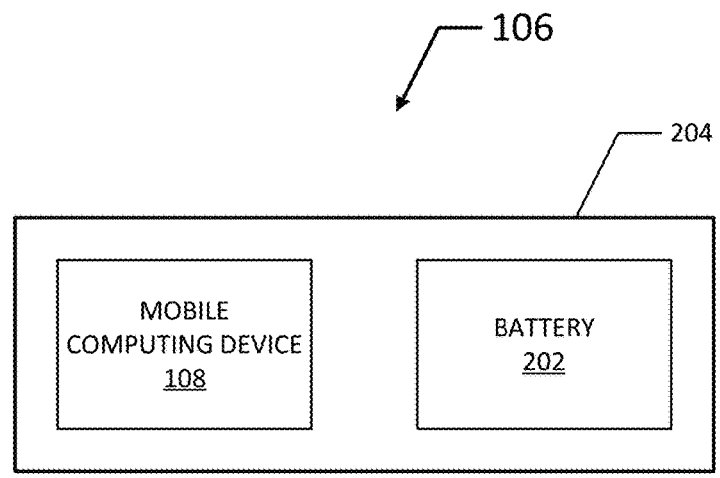
FIG. 2 illustrates an exemplary hub device according to an embodiment.

FIG. 2 illustrates an exemplary embodiment of hubs 106. In the illustrated embodiment, the hub 106 includes a mobile computing device 108, which includes at least one battery. The hub 106 also includes at least one additional battery 202 to increase the amount of electrical power available to the mobile computing device 108. The mobile computing device 108 and battery 202 are housed within an enclosure 204. For example, the enclosure 204 may be comprised of metal, plastic, and the like for providing protection to the mobile computing device 108 and battery 202.

Mobile Computing Devices

Figure 3:
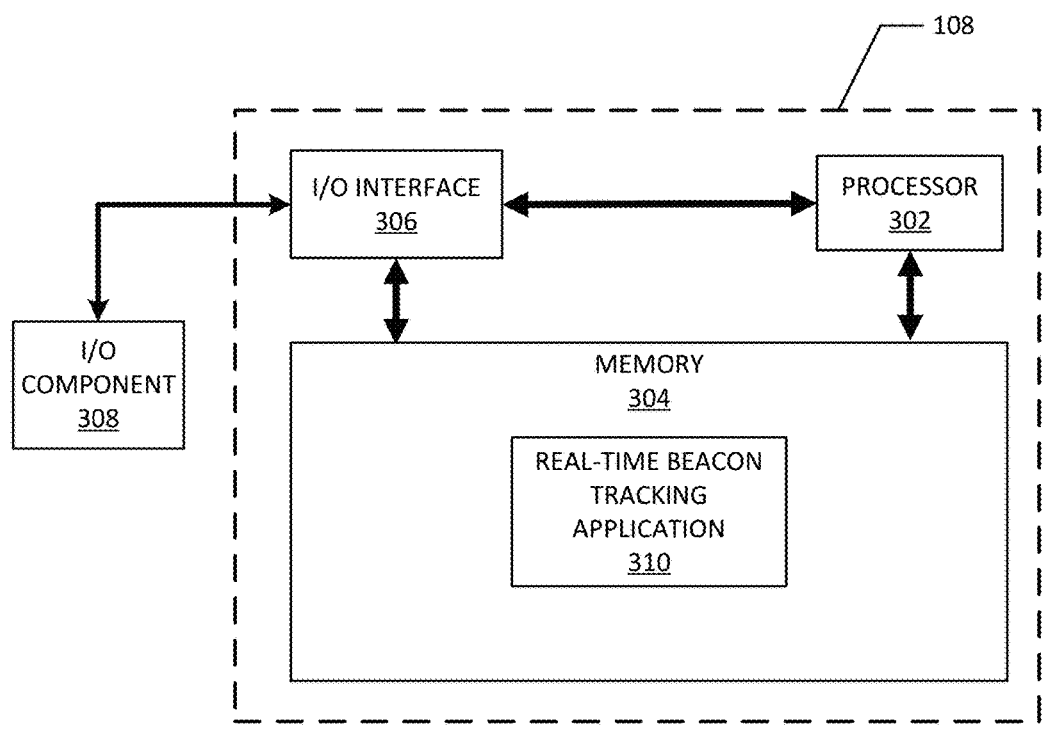
FIG. 3 illustrates an exemplary architecture of a mobile computing device according to an embodiment.

FIG. 3 illustrates an exemplary architecture of mobile computing devices 108 programmed to provide aspects of beacon tracking in accordance with an aspect of the present disclosure via a software environment. In this embodiment, mobile computing devices 108 each include a processor 302, a memory 304, and an input/output (I/O) interface 306 that interfaces with an I/O component 308. The memory 304 includes a real-time beacon tracking application 310 embodied in processor-executable instructions for executing by processor 302. In this manner, each mobile computing device 108 comprises a special-purpose computing device for tracking one or more beacons 104 in real time. Advantageously, utilizing real-time beacon tracking application 310 on existing mobile computing devices (e.g., devices of event attendees, etc.) reduces cost and reliance on proprietary hardware devices.

The processor 302, memory 304, and I/O interface 306 are communicatively connected and/or electrically connected to each other. The I/O interface 306 is communicatively and/or electrically connected to the I/O component 308. The processor 302 is adapted to execute processor-executable instructions stored in the memory 304 for implementing the beacon tracking in real time. The I/O interface 306 of FIG. 3 provides a physical data connection between computing device 108 and I/O component 308. In an embodiment, I/O interface 306 is a network interface card (NIC) or modem and I/O component 308 is a communications infrastructure (e.g., telecommunications infrastructure/network) as further described herein. Additionally or alternatively, I/O interface 306 may include an antenna, a transmitter, and/or a receiver configured to transmit and receive electromagnetic radiation in accordance with a wireless communications protocol (e.g., Bluetooth low energy, etc.) and I/O component may include a wireless communications network (e.g., personal area network, Bluetooth network, iBeacon, etc.).

Beacon Tracking Alternative Embodiment

Figure 4:
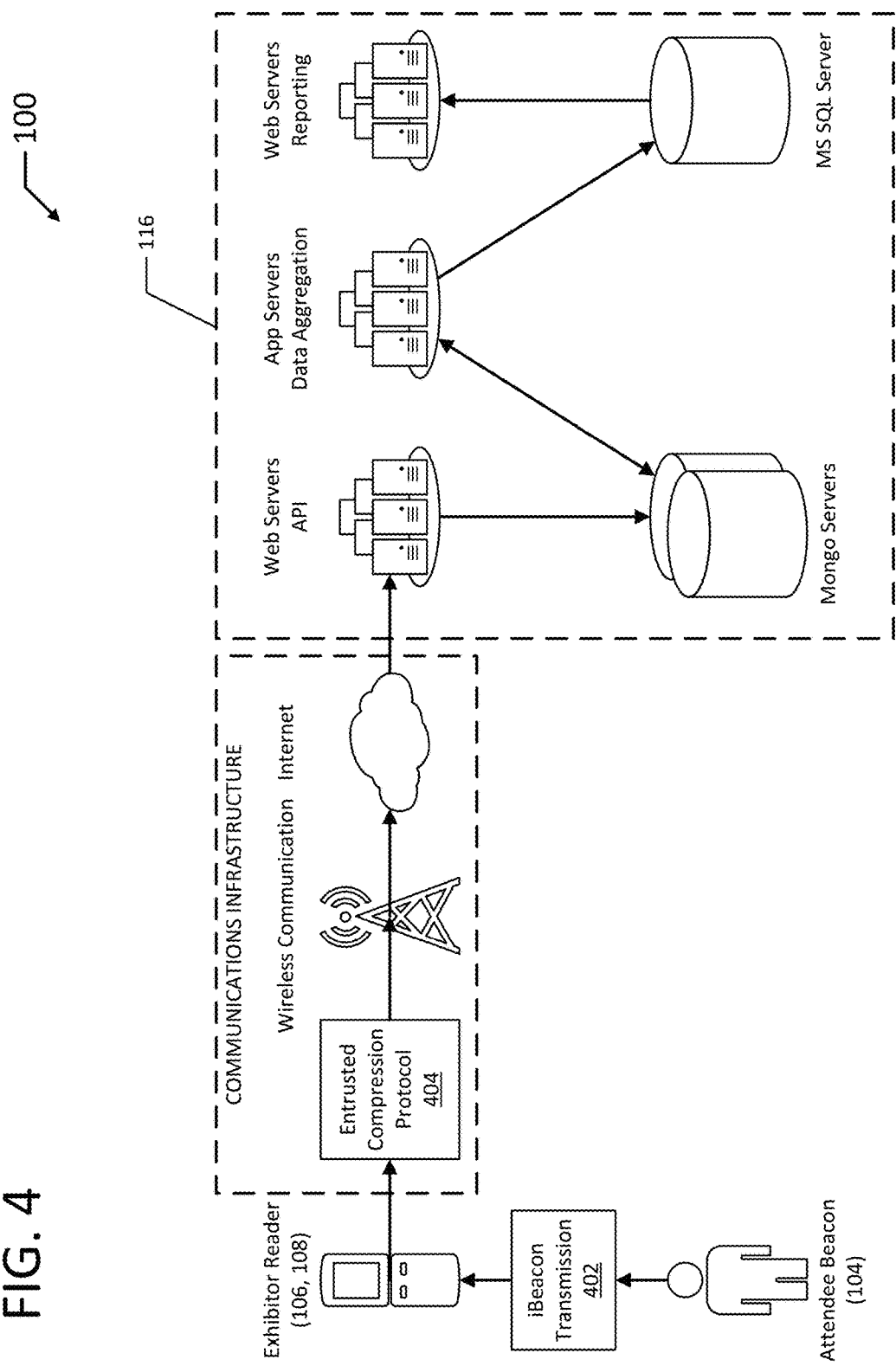
FIG. 4 illustrates an exemplary alternative embodiment of the beacon tracking system and process of FIG. 1.

FIG. 4 illustrates an alternative embodiment of beacon tracking system and process 100. As illustrated, hubs 106 and/or mobile computing devices 108 transmit, at 402, the extracted unique beacon identifier, the generated location and time data, and/or the reader identifier to server computing devices within the cloud computing environment 116 via the communications infrastructure. In an embodiment, the data is transformed through an entrusted data compression protocol(s) 404 before transmission, such as ProtoBuf Serialized Data over a Transport Layer Security (TLS) protocol. The cloud computing environment 116 in the illustrated embodiment includes a web servers application programming interface (API), raw capture data stores/databases, data aggregation application servers, and reporting databases and web servers.

Beacon Location Tracking

Figure 5:
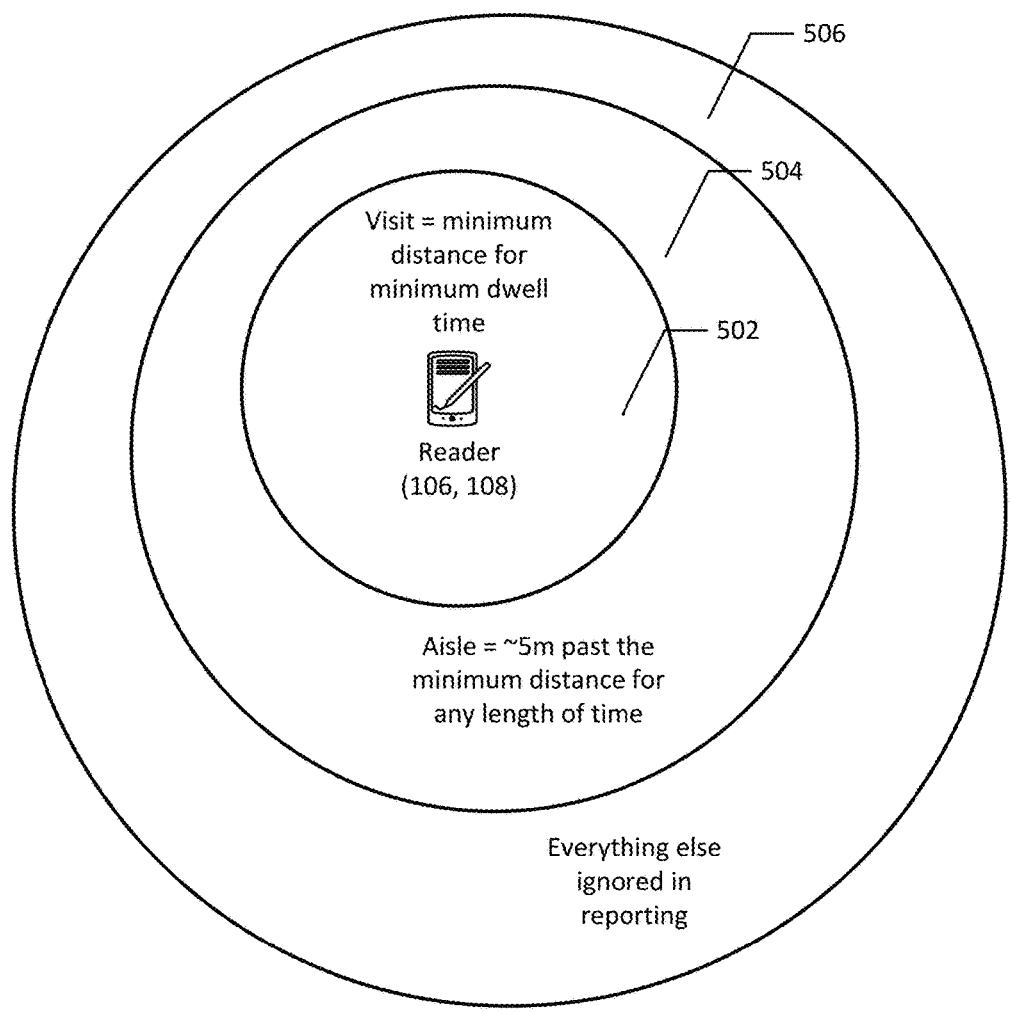
FIGS. 5-8 illustrate an exemplary embodiment in which a mobile computing device tracks a beacon throughout an event area according to an embodiment.
Figure 6:
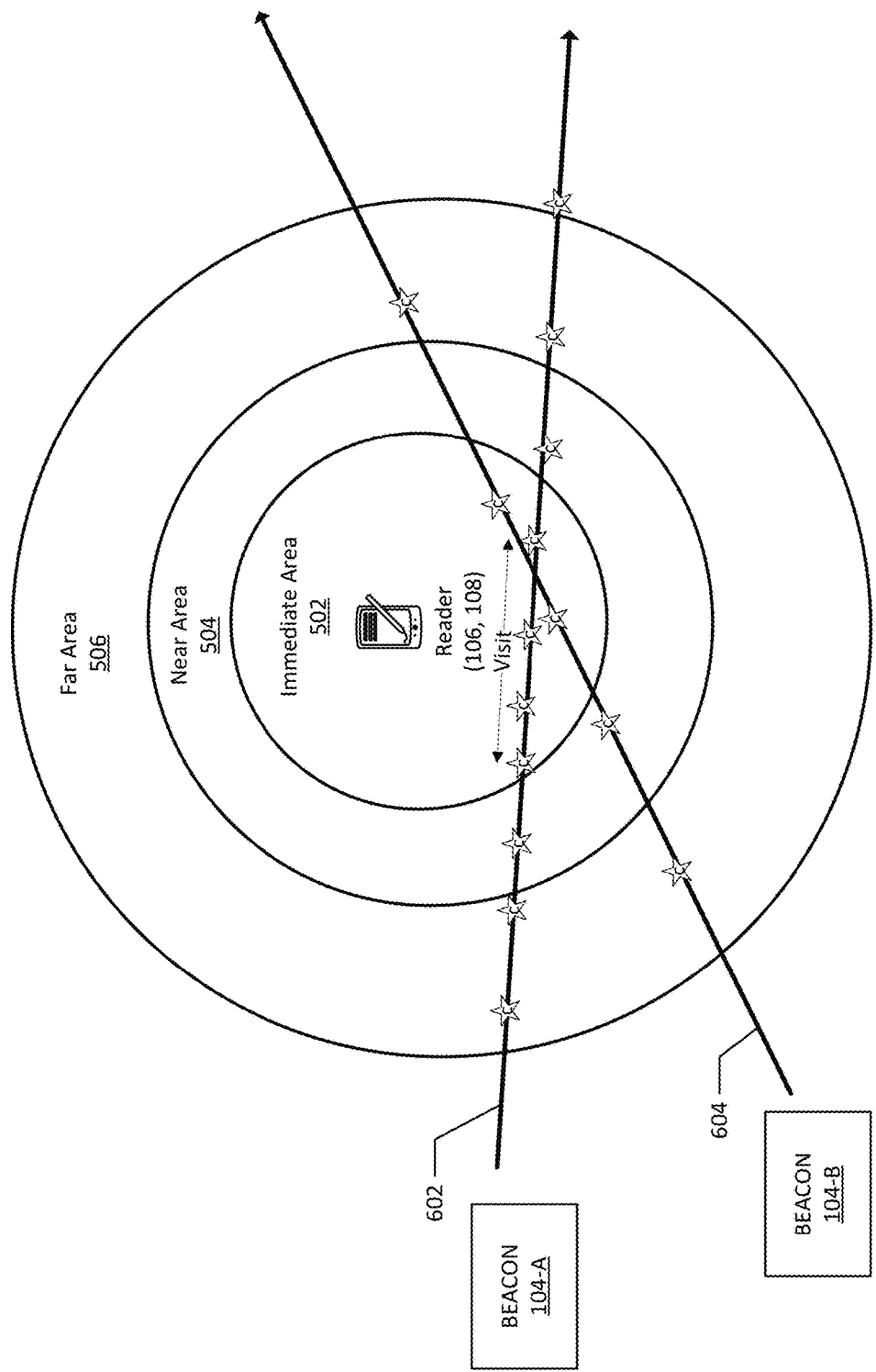

FIG. 5 illustrates an exemplary embodiment in which each reader tracks beacons 104 throughout at least an immediate area 502, a near area 504, and a far area 506. In an embodiment, the reader determines that beacon 104 is within the immediate area 502 when beacon 104 is within an immediate radius (e.g., about 0 feet to about 10 feet) for a minimum dwell time (e.g., 1 minute). For example, beacon 104 being within the immediate area 502 indicates that the associated event attendee visited an exhibitor booth associated with the hub 106 and/or mobile computing device 108 functioning as the reader. In an embodiment, each reader (e.g., hubs 106 and/or mobile computing devices 108) transmits a location beacon for a length of about 2-15 seconds with a period of about 30-90 seconds. As illustrated in FIG. 6, beacon reading pattern 602 for a first beacon 104-A is associated with a visit because the beacon readings (illustrated as stars) indicate the event attendee wearing the beacon 104-A dwelled near the reader. For example, the reader captured four reads of beacon 104-A within the immediate area 502 within the minimum dwell time. In contrast, beacon reading pattern 604 is not associated with a visit, even though a second beacon 104-B was within the immediate radius, because the beacon readings indicate the event attendee wearing the second beacon 104-B did not dwell near the reader. For example, beacon reading pattern 604 may indicate that an event attendee traveled by the reader without stopping.

Figure 7:
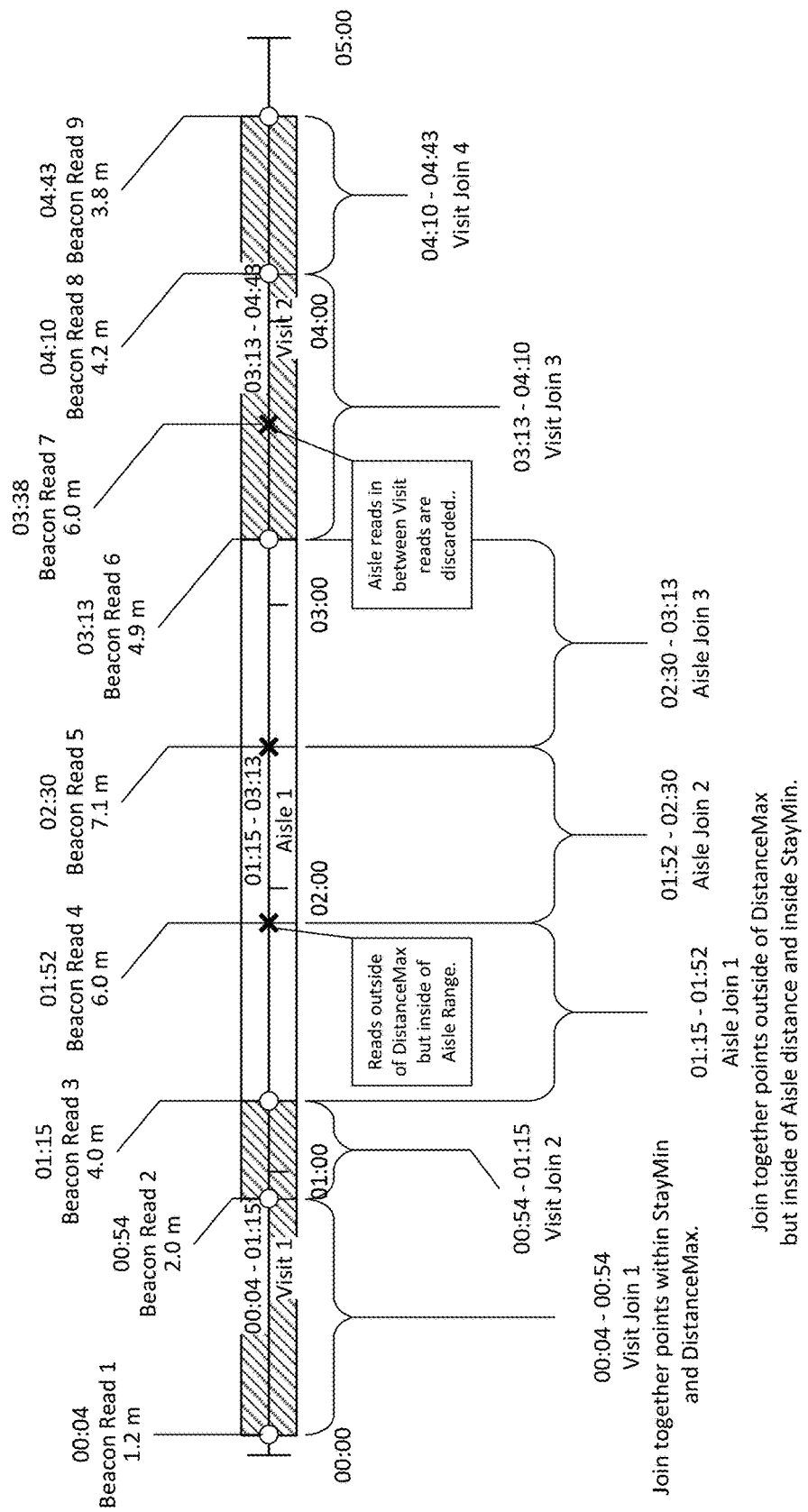
Figure 8:
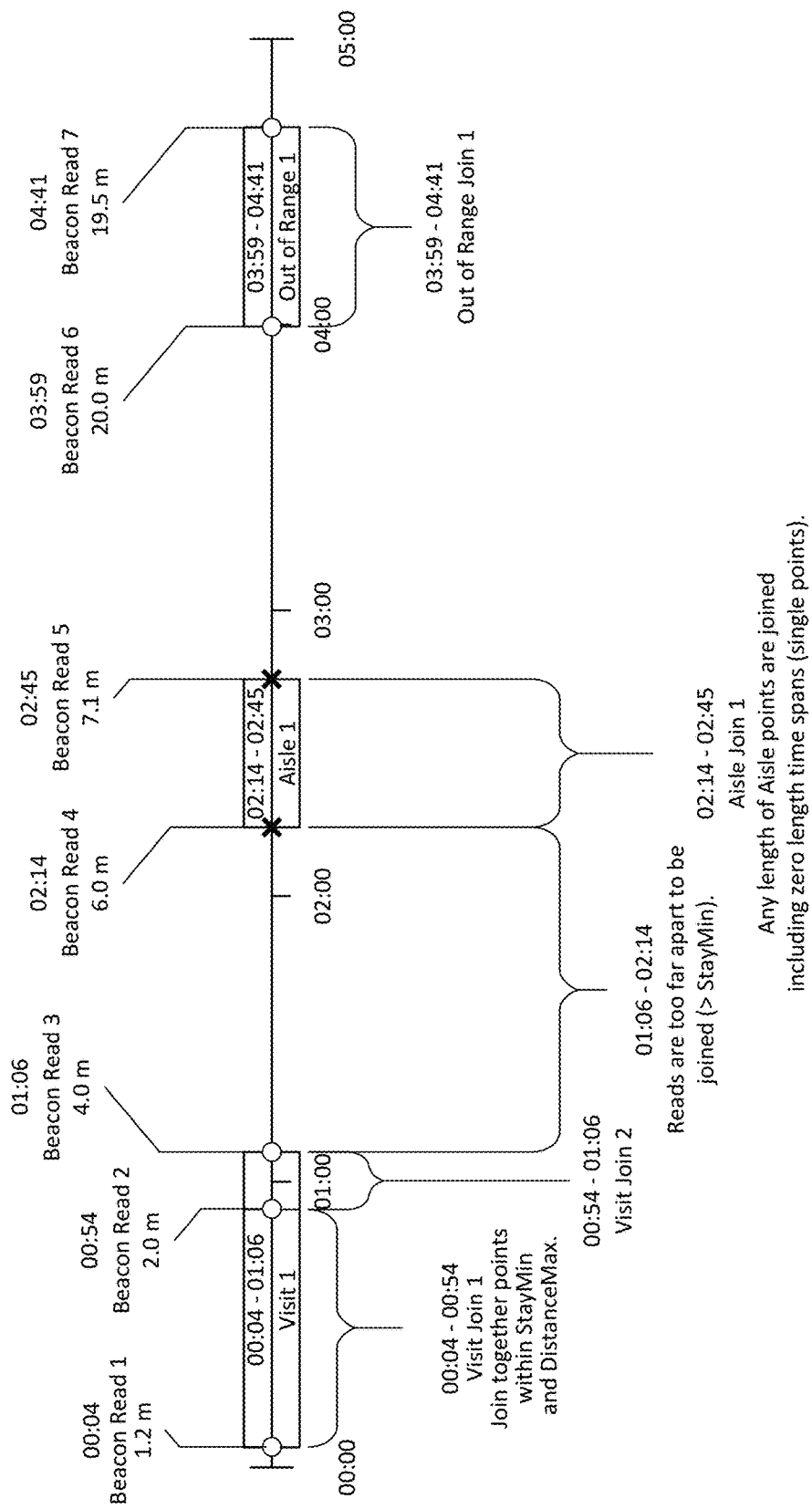

Referring again to FIG. 5, the reader determines that beacon 104 is within the near area 504 when beacon 104 is within a near radius (e.g., from about the end of the immediate radius to about 5 meters beyond the immediate radius) for any period of time. For example, beacon 104 being within the near area 504 indicates that the associated event attendee traveled through an aisle adjacent to an exhibitor booth associated with the hub 106 and/or mobile computing device 108 functioning as the reader. The reader determines that beacon 104 is within the far area 506 when beacon 104 is outside the near radius. In an embodiment, the reader has a range (e.g., maximum outer radius of the far area 506) of about 100 feet. In another embodiment, the reader ignores data collected when beacon 104 is within the far area 506. FIGS. 7 and 8 illustrate exemplary timelines showing read events by the reader for tracking beacons throughout the immediate area 502, near area 504, and far area 506. Appendix A of U.S. Provisional Patent Application Ser. Nos. 62/428,214 and 62/466,214, incorporated by reference above, provides exemplary data results of the reader determining time, a beacon identifier, a distance, and a proximity of beacons within range.

Figure 9:
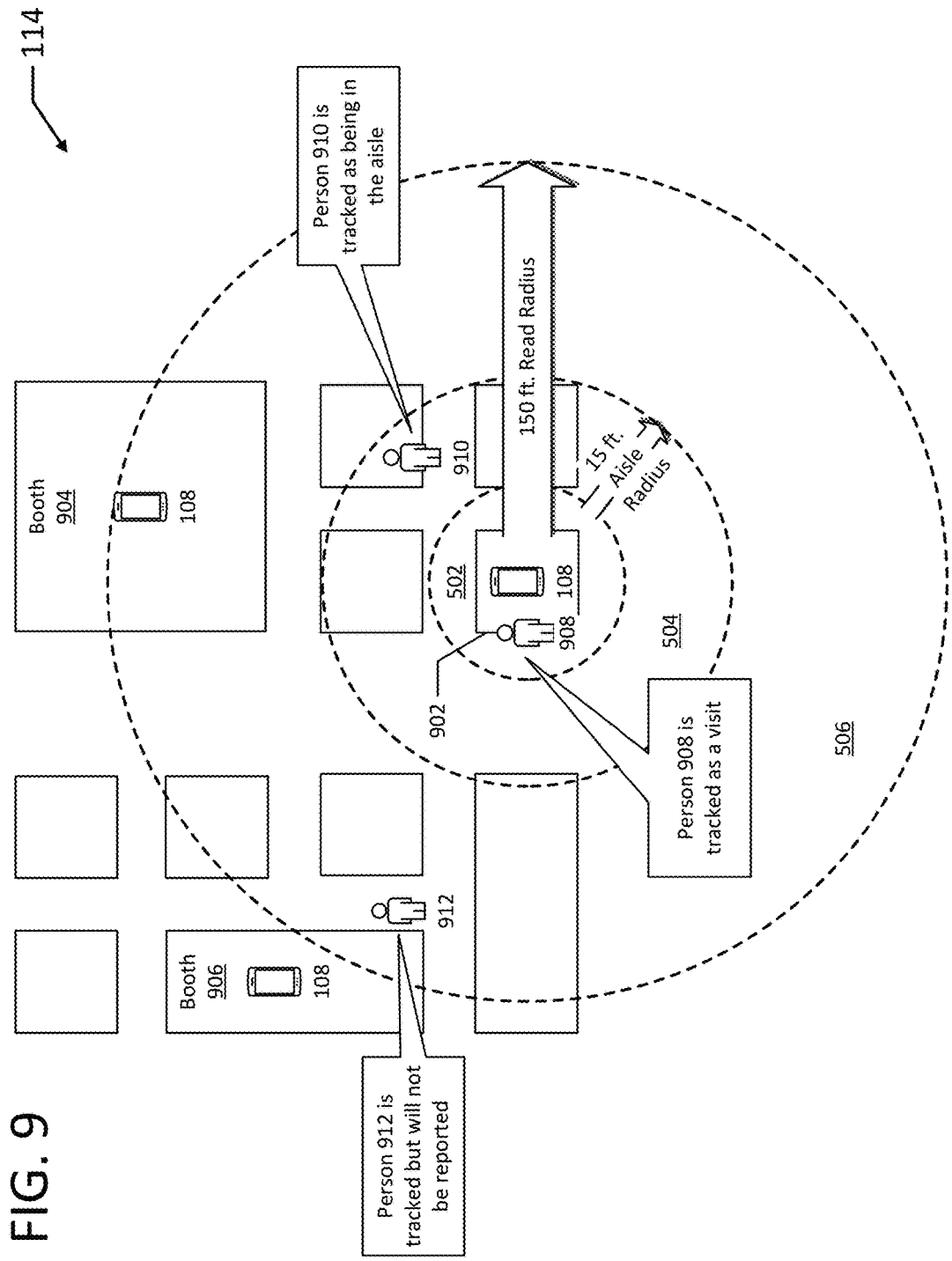
FIG. 9 illustrates an exemplary network of beacon reading devices distributed throughout an event area according to an embodiment.

FIG. 9 illustrates an exemplary embodiment of system and process 100 in which the reader tracking beacons are associated with people throughout an event area (e.g., event area 114). As illustrated, the reader at booth 902 is a mobile computing device 108 executing an iOS operating system and configured with a read radius of about 15 feet, an aisle distance of about 15 feet (e.g., 15 feet beyond the 15-foot immediate area), and a minimum dwell time of about 1 minute. Readers at booths 904 and 906 are each a mobile computing device 108 executing an Android operating system. In this embodiment, the radius of near area 504 is about 15 feet, the near area 504 extends from about 15 feet to about 30 feet, and the far area 506 is beyond about 30 feet, extending to about 150 feet. A first person 908 is tracked as a visit because the reader determined that the beacon 104 associated with the first person 908 was within 15 feet (e.g., immediate area 502) for at least one minute. A second person 910 is tracked as being with an aisle area because the reader at booth 902 determined that the beacon 104 associated with second person 910 was within 15 feet to 30 feet of the reader at booth 902. A third person 912 is tracked by the reader at booth 902 but will not be included in any reporting because the reader at booth 902 determined that the beacon 104 associated with the third person 912 was beyond about 30 feet (e.g., the aisle range).

Advantageously, aspects of the present disclosure are more accurate than conventional trilateration techniques due to the higher density of reader devices and the reduced effort to deploy (e.g., already deployed via lead retrieval device distribution, utilization of existing mobile computing devices, etc.). For instance, conventional trilateration deployment techniques place a reader only every 50-100 feet (e.g., due to reader cost, etc.), but the ability to accurately calculate the distance of a beacon (e.g., beacon 104) drops off significantly beyond 50 feet. In an aspect, the beacon tracking system and process 100 described herein typically covers at least about 60% of the event area 114 through mobile computing devices 108 also functioning as lead retrieval devices and usage of existing mobile computing devices 108, which results in a reader being located every about 30 feet within the event area 114. This higher reader density enables a more accurate location tracking of beacons 104.

Wakeup Triggers

Figure 10:
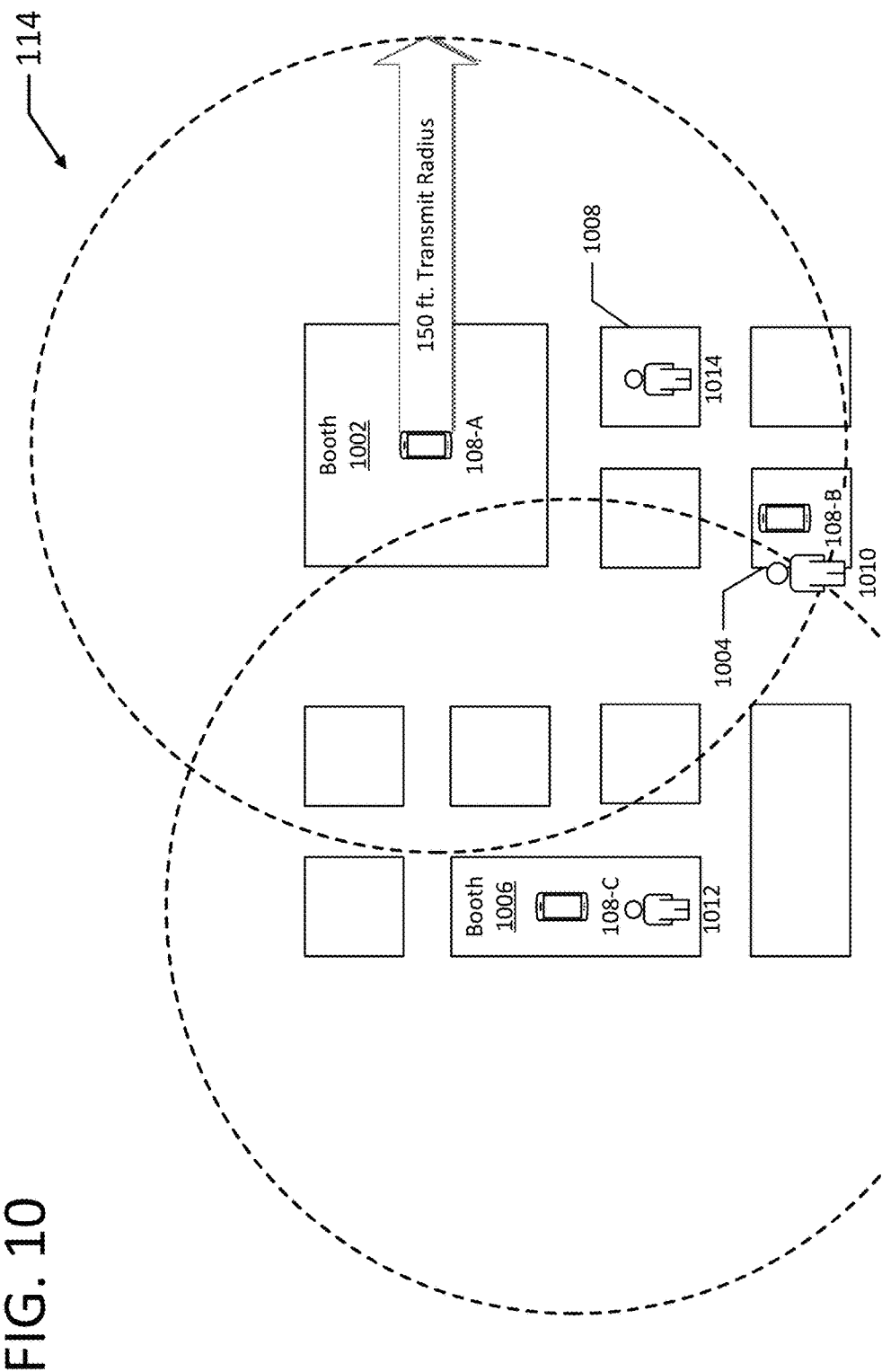
FIGS. 10 and 11 illustrate exemplary systems and processes for transmitting wakeup signals according to an embodiment.

FIG. 10 illustrates an exemplary embodiment of system and process 100 in which mobile computing devices 108 executing Android operating systems transmit wakeup signals. In an aspect, event area 114 may become saturated with all ten values of the Major parameter emitted by beacons 104 such that enter and exit events from the beacons 104 may not keep mobile computing devices 108 executing iOS operating systems awake and ranging. In the event of such a saturation condition, the mobile computing devices 108 executing Android operating systems emit electromagnetic radiation in accordance with the iBeacon protocol (e.g., UUID parameter, Major parameter, Minor parameter) to provide a wakeup signal to the mobile computing devices 108 executing iOS operating systems. In an embodiment, these wakeup signals include a Major parameter value of 100 or 101 and a randomly assigned value of the Minor parameter that uniquely identifies the mobile computing device 108 (e.g., reader) transmitting the wakeup signal. In an aspect, the value of the Major parameter is rotated between 100 and 101 at a predetermined interval (e.g., about 3 minutes, etc.) to account for clock skew between devices and to avoid saturation.

As illustrated in FIG. 10, a first mobile computing device 108-A executing an Android operating system is located at a first booth 1002, a second mobile computing device 108-B executing an iOS operation system is located at a second booth 1004, and a third mobile computing device 108-C executing an Android operating system is located at a third booth 1006. A first person 1010 having a beacon 104 associated therewith is located at the second booth 1004, a second person 1012 having a beacon 104 associated therewith is located at the third booth 1006, and a third person 1014 having a beacon 104 associated therewith is located at a fourth booth 1008. The mobile computing devices 108-A and 108-C periodically transmit a unique wakeup signal for a length of about 10 seconds to about 60 seconds once every about 100-300 seconds. The transmitted wakeup signal is designed to keep mobile computing devices 108 executing iOS operating systems (e.g., mobile computing device 108-B) active and ranging for beacons 104. In an embodiment, mobile computing devices 108 executing an iOS operating system only read beacon signals for 180 seconds. By transmitting the wakeup signal, mobile computing devices executing Android operating systems keep mobile computing devices executing iOS operating systems awake and reading beacon signals. In the embodiment illustrated in FIG. 10, mobile computing device 108-B is located outside the wakeup signal range of mobile computing device 108-C. Accordingly, mobile computing device 108-B is kept active by the wakeup signal transmitted by mobile computing device 108-A.

Figure 11:
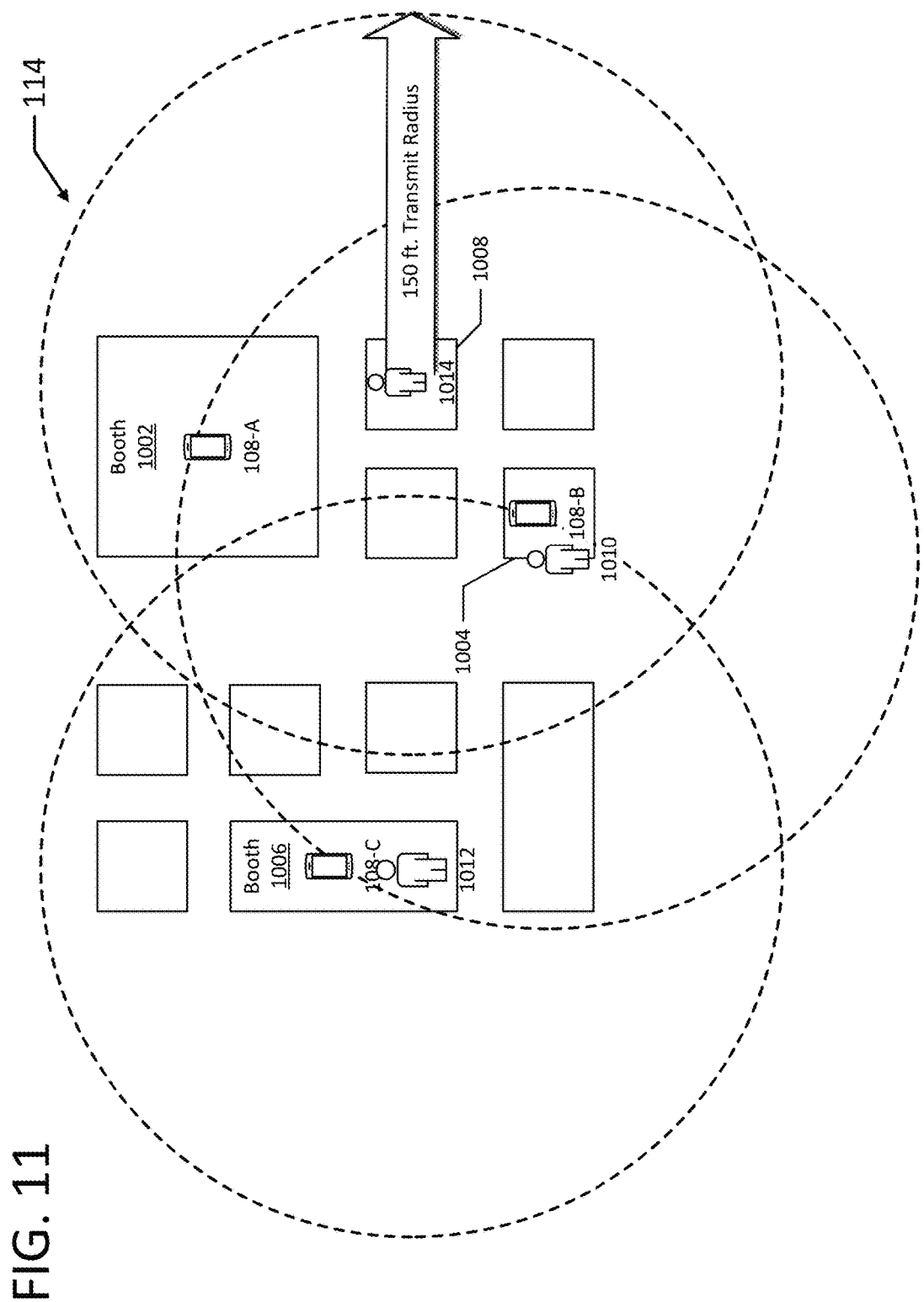

FIG. 11 illustrates an exemplary embodiment of system and process 100 in which beacons 104 associated with persons 1010, 1012, and 1014 provide a wakeup function to mobile computing devices 108 executing iOS operating systems (e.g., mobile computing device 108-B). In this embodiment, beacons 104 are distributed across ten different majors such that they create region enter and exit events for nearby devices 108 executing iOS operating systems. For example, the mobile computing device 108-B executing an iOS operating system in booth 1004 in FIG. 11 is kept alive by beacons 104 associated with persons 1010, 1012, and 1014 as they move throughout the event area 114.

Appendix B of U.S. Provisional Patent Application Ser. Nos. 62/428,214 and 62/466,214, incorporated by reference above, includes additional details regarding wakeup beacons.

Indoor Navigation

Figure 12:
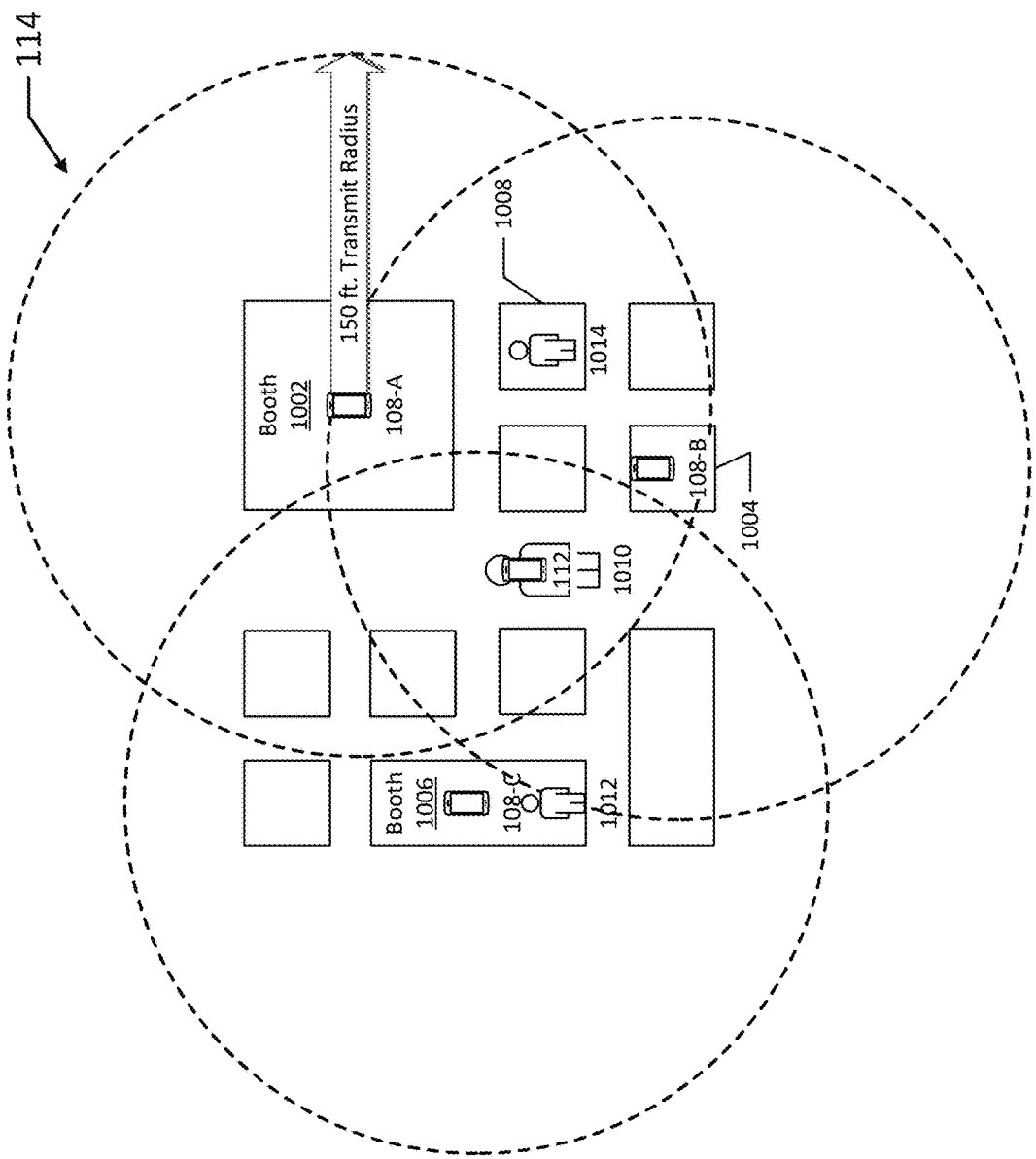
FIG. 12 illustrates an exemplary system and process for indoor navigation throughout an event area according to an embodiment.

FIG. 12 illustrates an exemplary embodiment of system and process 100 in which user computing device 112 executing real-time beacon tracking application 310 provides indoor navigation throughout the event area 114. As described above, mobile computing devices 108 executing Android operating systems at exhibitor booths periodically transmit a signal for a length of about 10 seconds to about 60 seconds with a period between about 100 seconds and about 300 seconds. In an embodiment, the signals transmitted by mobile computing devices 108 executing Android operating systems include a Major parameter value of 200 and are broadcast at a predetermined interval (e.g., once every minute, etc.). The user computing device 112 receives the transmitted wakeup signals and trilaterates its position in the event area.

Backfill

Figure 13:
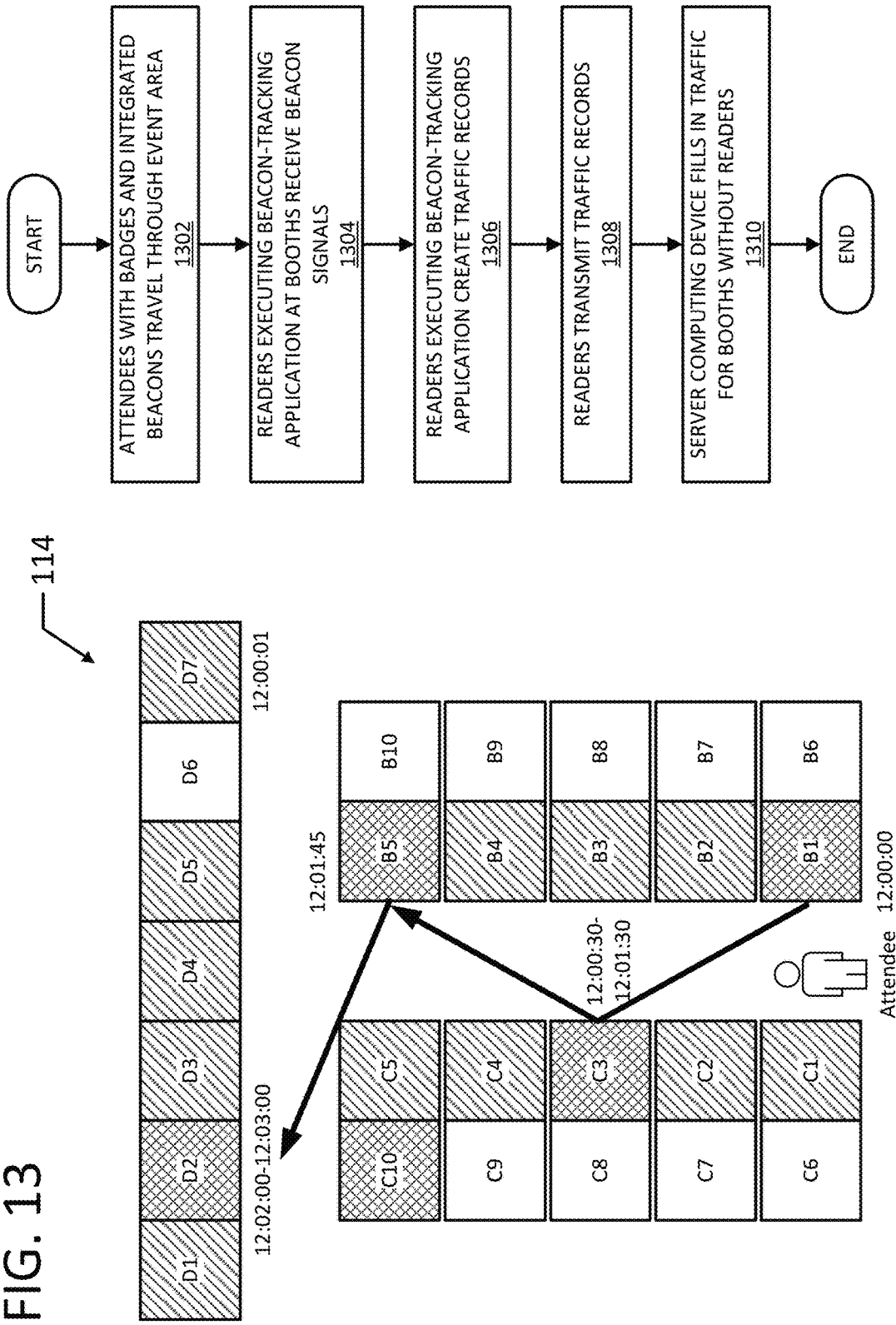
FIG. 13 illustrates an exemplary system and process for extrapolating event area traffic according to an embodiment.

FIG. 13 illustrates an exemplary embodiment of system and process 100 configured to extrapolate floor traffic data from exhibitors with read points (e.g., readers, mobile computing devices 108, hubs 106) to apply to exhibitors without read points. In some instances, not every exhibitor at a tradeshow will utilize a receiver (e.g., mobile computing device 108) in accordance with aspects of the invention. Despite their lack of participation, aspects of the present invention (e.g., real-time beacon tracking application 310, software applications executing on server computing device 110 and/or cloud computing environment 116, etc.) extrapolate attendee traffic between known read points to infer and calculate attendee traffic for non-participating exhibit booth locations. In an embodiment, the extrapolated traffic is used to provide attendee traffic and behavioral data to exhibitors and tradeshow organizers.

FIG. 13 illustrates an exemplary arrangement of booths in event area 114. For example, booths D1-D8 are arranged in accordance with the coordinates in Table 1.

TABLE 1

| Booth | Polygon |
|---|---|
| D1 | {0, 0}, {10, 0}, {10, 10}, {0, 10} |
| D2 | {10, 0}, {20, 0}, {20, 10}, {10, 10} |
| D3 | {20, 0}, {30, 0}, {30, 10}, {20, 10} |
| D4 | {30, 0}, {40, 0}, {40, 10}, {30, 10} |
| D5 | {40, 0}, {50, 0}, {50, 10}, {40, 10} |
| D6 | {50, 0}, {60, 0}, {60, 10}, {50, 10} |
| D7 | {60, 0}, {70, 0}, {70, 10}, {60, 10} |
| D8 | {70, 0}, {80, 0}, {80, 10}, {70, 10} |

As illustrated in FIG. 13, an attendee with a badge 102 integrated with a beacon 104 travels (1302) throughout the event area 114 during a time period of 12:00:00 PM to 12:03:00 PM. Readers (e.g., mobile computing devices 108, hubs 106) located at certain exhibitor booths (e.g., booths B1, C3, B5, D2, C10 illustrated with cross-hatching) and executing the real-time beacon tracking application 310 receive (1304) beacon signals from the beacon 104 associated with the attendee. After receiving the beacon signals, the readers executing the real-time beacon tracking application 310 create (1306) a record (e.g., traffic record) of locations (e.g., booths) and times for the beacon 104 associated with the attendee. The readers transmit (1308), via the communications infrastructure, the traffic record to server computing device 110 and/or cloud computing environment 116. Software applications executing on server computing device 110 and/or cloud computing environment 116 receive and analyze (1310) the traffic record to fill in traffic for booths in the event area 114 without readers (e.g., booths B2, B3, B4, C1, C2, C4, C5, D1, D3, D4, D5 illustrated with linear hatching) that are adjacent to booths with readers. In an embodiment, these filled-in traffic records are referred to as being "backfilled." In an aspect, software applications executing on server computing device 110 and/or cloud computing environment 116 are able to fill in missing aisle traffic numbers because of the knowledge about arrangement of booths from the coordinates and which booths an attendee with a beacon 104 must have traveled by to get from one booth with a reader to another booth with a reader (e.g., to get from booth B2 to booth C3 the attendee must have traveled by booths C1, C2, and B2). In an embodiment in which each booth is 10 feet by 10 feet, an evenly spaced reader coverage of at least about 30% enables estimating the traffic for the rest of the event area 114. Table 2 illustrates an exemplary traffic record for the attendee pattern illustrated in FIG. 13.

TABLE 2

| Booth | Entry Time | Exit Time | Type |
|---|---|---|---|
| B1 | 1/1/17 12:00:00 PM | 1/1/17 12:00:00 PM | Aisle |
| C10 | 1/1/17 12:00:00 PM | 1/1/17 12:00:00 PM | Backfill |
| D7 | 1/1/17 12:00:01 PM | 1/1/17 12:00:01 PM | Drift |
| B2 | 1/1/17 12:00:15 PM | 1/1/17 12:00:15 PM | Backfill |
| C2 | 1/1/17 12:00:15 PM | 1/1/17 12:00:15 PM | Backfill |
| C3 | 1/1/17 12:00:30 PM | 1/1/17 12:01:30 PM | Aisle |
| B3 | 1/1/17 12:00:30 PM | 1/1/17 12:01:30 PM | Backfill |
| B4 | 1/1/17 12:01:37 PM | 1/1/17 12:01:37 PM | Backfill |
| C4 | 1/1/17 12:01:37 PM | 1/1/17 12:01:37 PM | Backfill |
| B5 | 1/1/17 12:01:45 PM | 1/1/17 12:01:45 PM | Aisle |
| C5 | 1/1/17 12:01:45 PM | 1/1/17 12:01:45 PM | Backfill |
| D4 | 1/1/17 12:01:45 PM | 1/1/17 12:01:45 PM | Backfill |
| D5 | 1/1/17 12:01:45 PM | 1/1/17 12:01:45 PM | Backfill |
| D6 | 1/1/17 12:01:45 PM | 1/1/17 12:01:45 PM | Backfill |
| D2 | 1/1/17 12:02:00 PM | 1/1/17 12:03:00 PM | Aisle |
| C10 | 1/1/17 12:02:00 PM | 1/1/17 12:03:00 PM | Aisle |
| D1 | 1/1/17 12:02:00 PM | 1/1/17 12:03:00 PM | Backfill |

Spot

Figure 14:
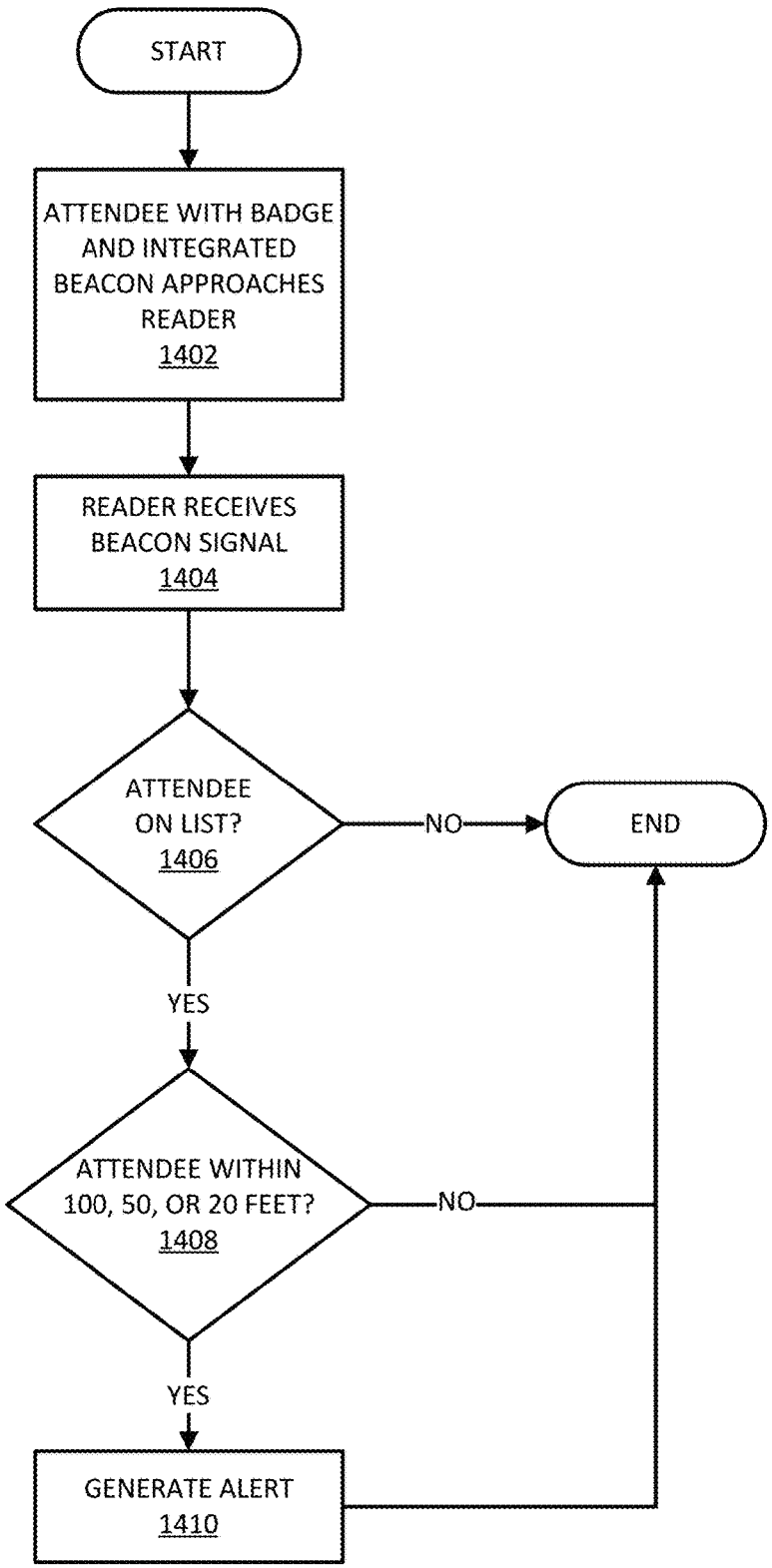
FIGS. 14 and 15 illustrate an exemplary system and process for notifying exhibitors of the presence of attendees of interest according to an embodiment.
Figure 15:
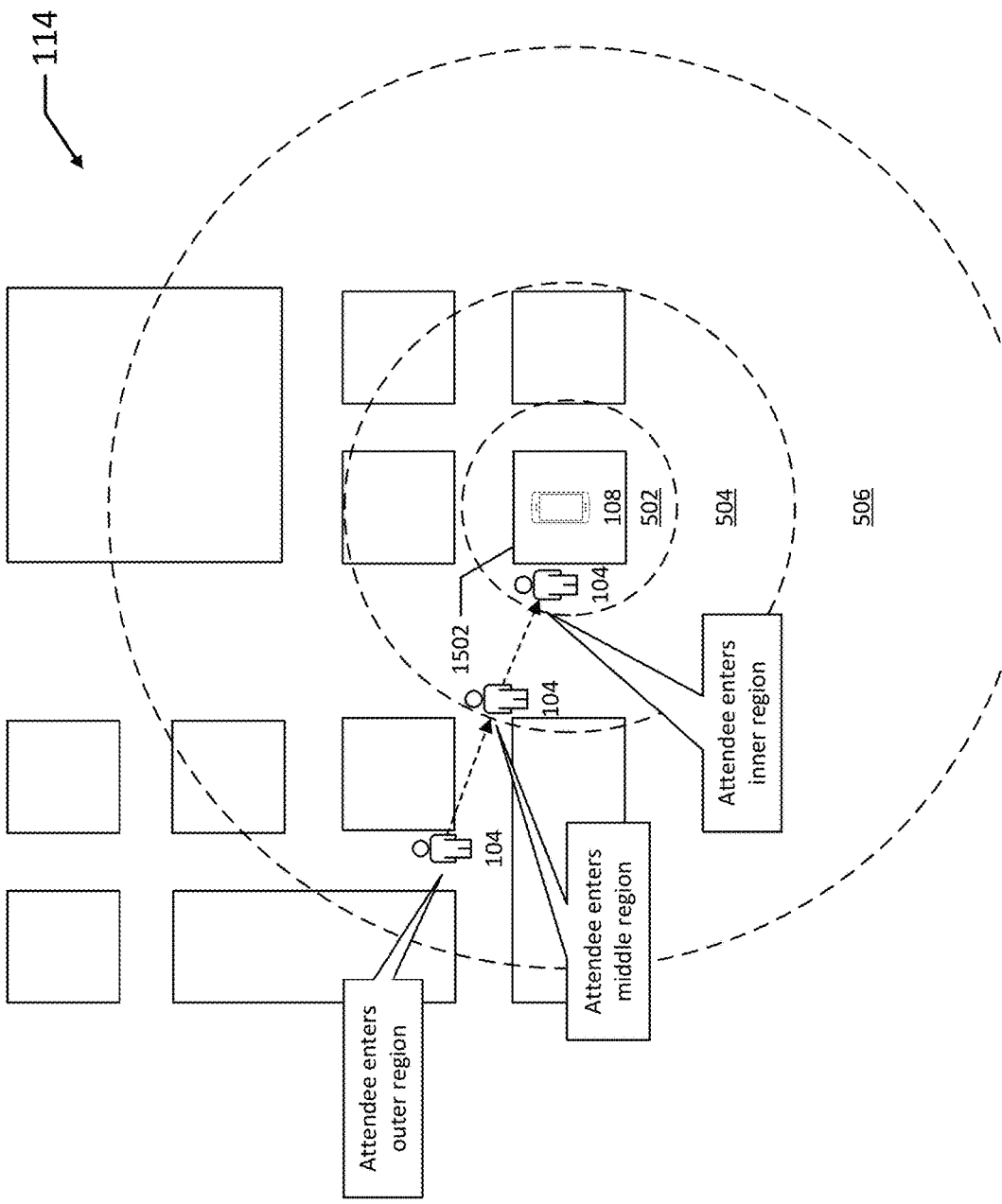

FIGS. 14 and 15 illustrate an exemplary embodiment of system and process 100 configured to notify exhibitors of the presence of attendees of interest when proximate to their booth location by sending alert notifications to their mobile computing devices 108. In an embodiment, exhibitors can identify types of individuals by pre-selecting specific demographic answer groups that are of specific business interest. When attendees (e.g., beacons 104 associated with event attendees) matching this specific criteria are proximate to a specific exhibitor location, aspects of the present invention (e.g., real-time beacon tracking application 310, software applications executing on server computing device 110 and/or cloud computing environment 116, etc.) generate and transmit alert notifications to the mobile computing devices of the exhibiting personnel that these attendees of interest are nearby.

As illustrated in FIGS. 14 and 15, an attendee with a badge 102 integrated with beacon 104 approaches (1402) a booth 1502 having a mobile computing device 108 executing the real-time beacon tracking application 310. In the illustrated embodiment, mobile computing device 108 has an immediate area 502 read radius of about 20 feet, a near area 504 read radius of about 50 feet, and a far area 506 read radius of about 100 feet. Moreover, the mobile computing device 108 is configured to monitor for the beacon 104 of the attendee by company name (e.g., ABC Company) and will receive push notification alerts as the attendee with the beacon 104 nears the mobile computing device.

As the attendee with the beacon 104 approaches, the mobile computing device 108 receives (1404) the beacon signal from the beacon 104 of the attendee. At 1406, aspects of the disclosure determine whether the attendee associated with the beacon 104 is on a SPOT list of companies for the exhibitor associated with the mobile computing device 108. In an embodiment, mobile computing device 108 executing the real-time beacon tracking application 310 makes this determination. Additionally or alternatively, software applications executing on server computing device 110 and/or cloud computing environment 116 make this determination. When the attendee is not on the SPOT list the process ends. When the attendee is on the SPOT list the process continues to 1408.

At 1408, aspects of the disclosure analyze the beacon signal received from the beacon 104 to determine the distance between the mobile computing device 108 and the beacon 104. In an embodiment, mobile computing device 108 executing the real-time beacon tracking application 310 makes this determination. Additionally or alternatively, software applications executing on server computing device 110 and/or cloud computing environment 116 make this determination. When the attendee has not entered a new area (e.g., immediate area 502, near area 504, far area 506) the process ends. When the attendee has entered a new area, the mobile computing device 108 generates (1410) an alert. For example, the alert may be an audible alert generated by a speaker of mobile computing device 108, a visual alert generated on a graphical user interface of a display of mobile computing device 108, a tactile alert generated by a vibrating mechanism of mobile computing device, or the like. In an embodiment, the real-time beacon tracking application 310 executing on mobile computing device 108 generates the alert. Additionally or alternatively, software applications executing on server computing device 110 and/or cloud computing environment 116 generate and transmit the alert to the mobile computing device 108. In this manner, mobile computing device 108 generates a first alert when the attendee and associated beacon 104 enter an outer monitoring region (e.g., far area 506), a second alert when the attendee and associated beacon 104 enter a middle monitoring region (e.g., near area 504), and a third alert when the attendee and associated beacon 104 enter an inner monitoring region (e.g., immediate area 502).

Exhibitor Drift

Figure 16:
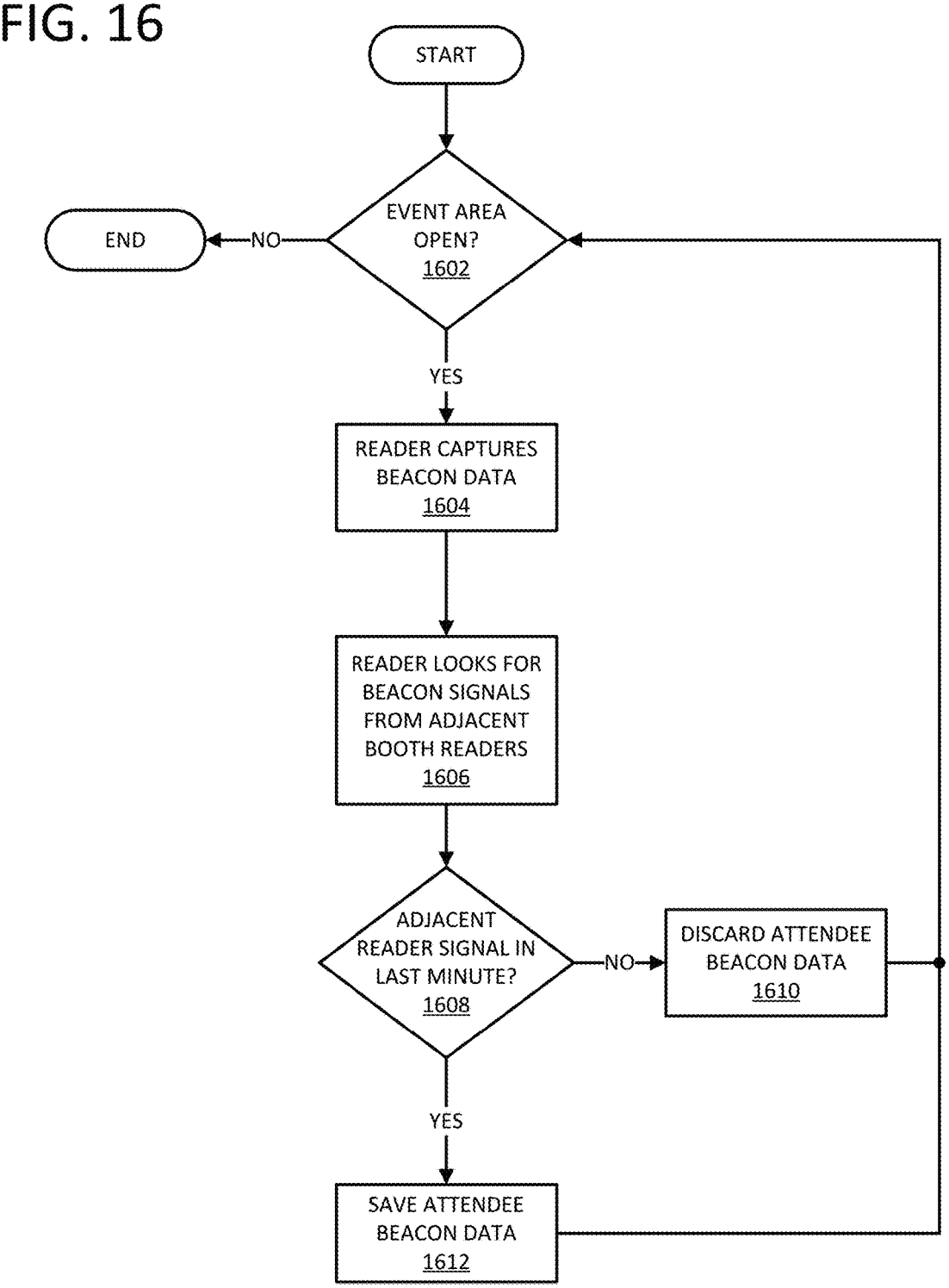
FIGS. 16 and 17 illustrate an exemplary system and process for determining if an exhibitor's mobile computing device has moved from an assigned area according to an embodiment.
Figure 17:
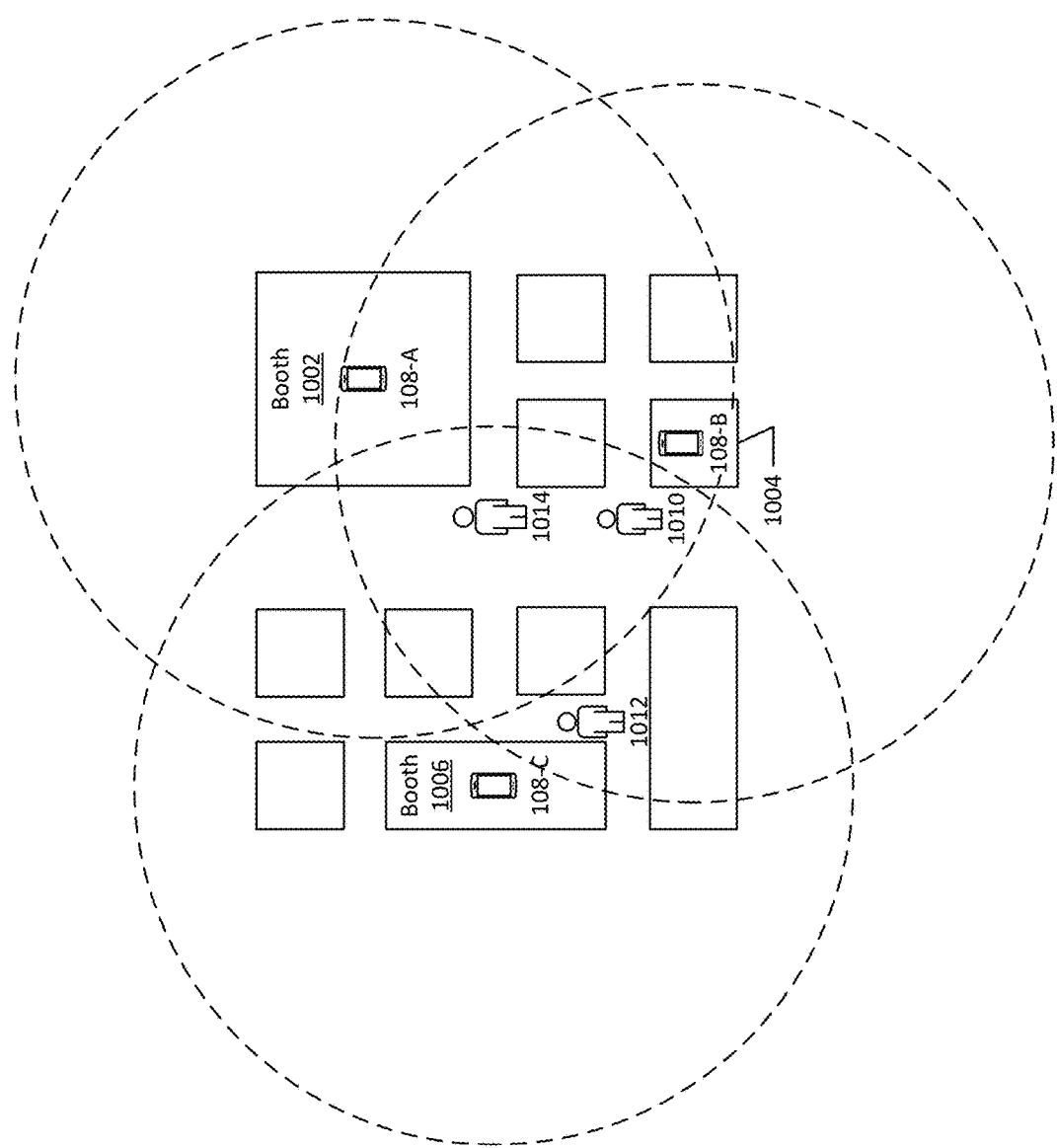

FIGS. 16 and 17 illustrate an exemplary embodiment of system and process 100 configured to determine if an exhibitor has left their booth location with their device (e.g., mobile computing device 108) and to exclude beacon readings while away from their booth. Referred to as "exhibitor drift" in one or more embodiments, aspects of the present invention utilize an existing network of lead retrieval computing devices (e.g., mobile computing devices 108) to transmit periodic electromagnetic radiation signals (e.g., Bluetooth low energy signals) identified as "location signals" on a period between about 30 and 90 seconds. The location signals transmitted by mobile computing devices 108 include a Major parameter value of 200 and are broadcast at a predetermined interval (e.g., once every minute, etc.) in accordance with an aspect of the disclosure. In an embodiment, these location signals are pre-associated to known exhibiting booth locations within an event space. Aspects of the present invention (e.g., real-time beacon tracking application 310, software applications executing on server computing device 110 and/or cloud computing environment 116, etc.), examine every read sample for the existence of location signals therein and compare those signals to an expected set given exhibitor location to thereby determine when specific exhibitor booth personnel holding a mobile receiver (e.g., mobile computing device 108) has distanced themselves outside an expected read location (e.g., their booth area). In an embodiment, attendee location signal reads by a receiver outside its assigned location will be disregarded in determining the location of the attendee (e.g., beacon 104) in location-specific reporting.

In an embodiment, the process illustrated by FIG. 16 is triggered to start every minute. At 1602 a determination is made about whether the event area 114 is open (e.g., scheduled open to attendees during an event, etc.). When the event area 114 is closed the process ends. When the event area 114 is open, the reader (e.g., mobile computing device 108 executing real-time beacon tracking application 310) captures (1604) beacon data (e.g., from beacons 104). At 1606, the reader looks for beacon signals emitted by readers assigned to adjacent booths based on floor map coordinates. As illustrated in FIG. 17, each reader (e.g., mobile computing devices 08-A, 108-B, 108-C) transmits a unique beacon signal and listens for beacon signals from other readers. If a reader cannot hear the signals of the readers assigned to adjacent booths, it is considered "drifting" outside of the booth and will discard attendee beacon reads. At 1608, the reader determines whether it has received a beacon signal from a reader in an adjacent booth within the previous minute. When the reader has not received a beacon signal from a reader in an adjacent booth within the last minute the reader discards (1610) beacon data captured from beacons 104 since the last valid adjacent reader signal was detected and loops back to 1602. When the reader has received a beacon signal from a reader in an adjacent booth within the last minute the reader saves (1612) the beacon data captured from beacons 104 and loops back to 1602. Although described as a one minute predetermined interval, one of ordinary skill in the art will understand that predetermined intervals of other lengths are within the scope of the present disclosure.

Alerts

Figure 18:
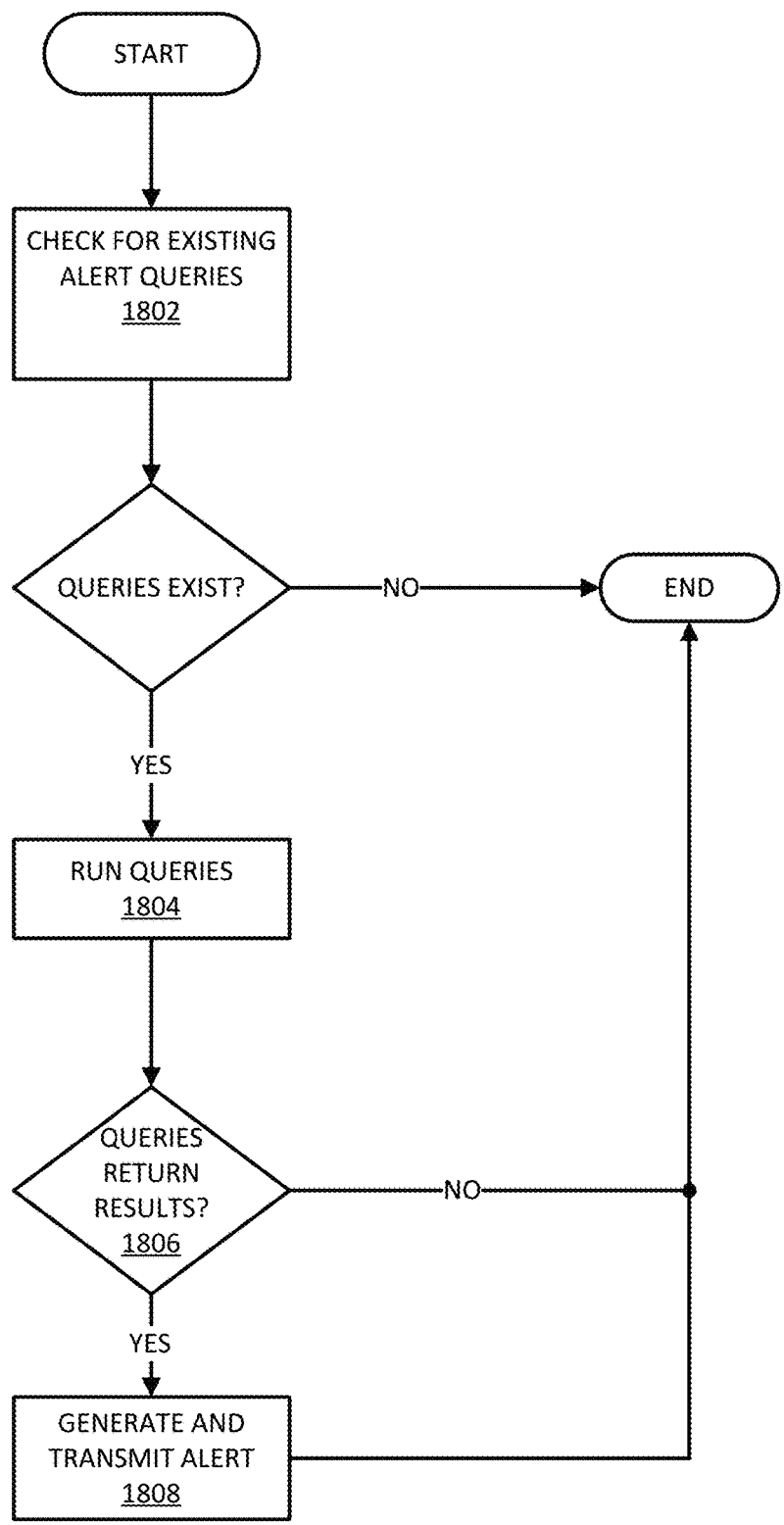
FIG. 18 illustrates an exemplary process of generating alerts according to an embodiment.

FIG. 18 illustrates an exemplary process, generally indicated at 1800, of generating alerts within system and process 100. In an embodiment, the process 1800 is performed by software applications executing on server computing device 110 and/or cloud computing environment 116. The start of the process is triggered at every data change. At 1802 the computing device checks for existing alert queries. In an embodiment, software applications executing on server computing device 110 and/or cloud computing environment 116 include an interface that allows an administrative user to enter any custom query that defines an alert condition. The query can be any set of business logic that is executable against the data set. For example, the query can be dimensions of counts, percentages, time ranges, change rates, and the like. Examples of business logic include, but are not limited to, "Notify me if the average dwell time in Area X exceeds 15 minutes" which could be used to monitor shuttle wait lines for example, "Notify me hourly on the attendance level in Area X" which could be used to monitor ongoing attendance in an all-day continuing education session for example, and "Notify me when total attendee count on the entire show floor drops below 90% of the maximum level". When no alert queries exist the process ends. When at least one query exists the computing device runs the query at 1804. At 1806 the computing device determines whether the queries return results. When the queries do not return results the process ends. When the queries do return results the computing device generates and transmits an alert (e.g., email, short message service (SMS) message, API POST, etc.) with alert information to mobile computing devices 108 and/or user computing devices 112 at 1808.

Beacon Tracking Application

The following describes an exemplary embodiment of real-time beacon tracking application 310. In an embodiment, real-time beacon tracking application 310 instructs hubs 106 and/or mobile computing devices 108 to transmit a location beacon as further described herein.

The application 310 is an Android application. The application 310 requires mobile computing devices 108 with a Bluetooth Low Energy (LE) 4.0 and above chipset. In an embodiment, application 310 requires Android OS KitKat (API 19) and above. The application 310 also requires the following permissions granted by users: Bluetooth, Bluetooth Admin, Internet, Access Wifi State, Access Network State, and Access Coarse Location, which is required to access cellular signal strength.

In an embodiment, mobile computing device 108 (e.g., executing an Android or iOS operating system) launches application 310 when an icon for the application (e.g., on a home screen, etc.) is selected (e.g., tapped on a touchscreen interface). In an embodiment, a user will be prompted to allow application 310 to access the location of mobile computing device 108. For example, application 310 may display a prompt on the first application launch and/or when location permission has not been previously granted. The user must allow location permission to enable application 310 to see beacons (e.g., beacon 104). Upon granting location permission, application 310 may display a screen that includes a status bar, a reader identifier, location, and schedule sections. In an embodiment, the device is not yet configured to an event upon granting location permission and a button (e.g., a "+" button) may be selected to add the device to an event.

Figure 19:
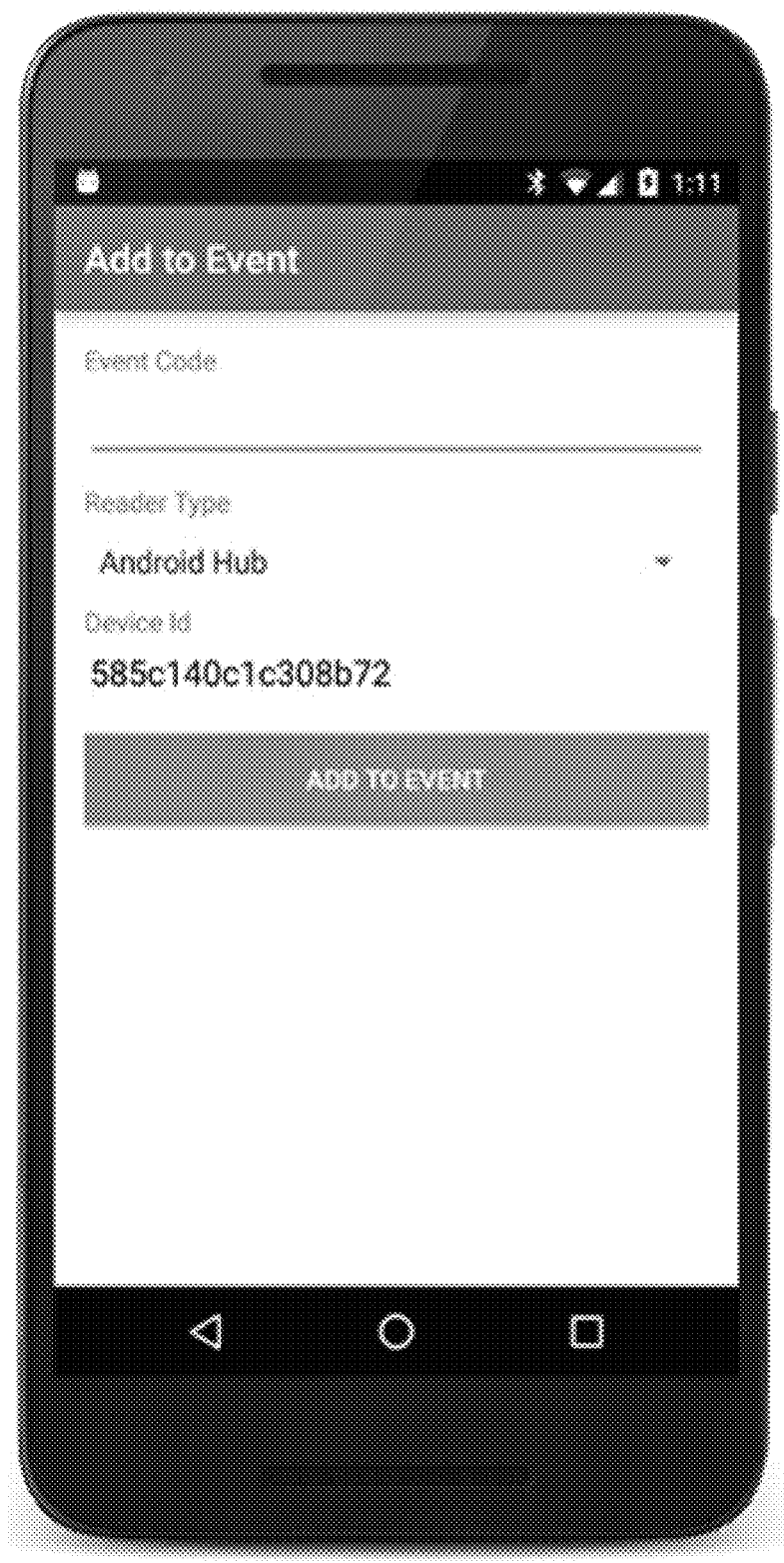
FIG. 19 illustrates an exemplary screenshot of a beacon tracking application according to an embodiment.

FIG. 19 illustrates an exemplary screenshot of an Add to Event screen of application 310. The screen includes an editable field for an event code. The screen includes the Device ID, which is the unique identifier for the device. A user inputs (e.g., types) an event code into the editable Event Code textbox and selects the "Add to Event" button. If the event cannot be found, an error dialog appears (not shown). If the event associated with the entered event code is available, an application programming interface (API) of application 310 sends back the following information: location identifier, reader identifier, authentication claims (e.g., token) and cookies, and/or authentication token for a reader log API.

Figure 20:
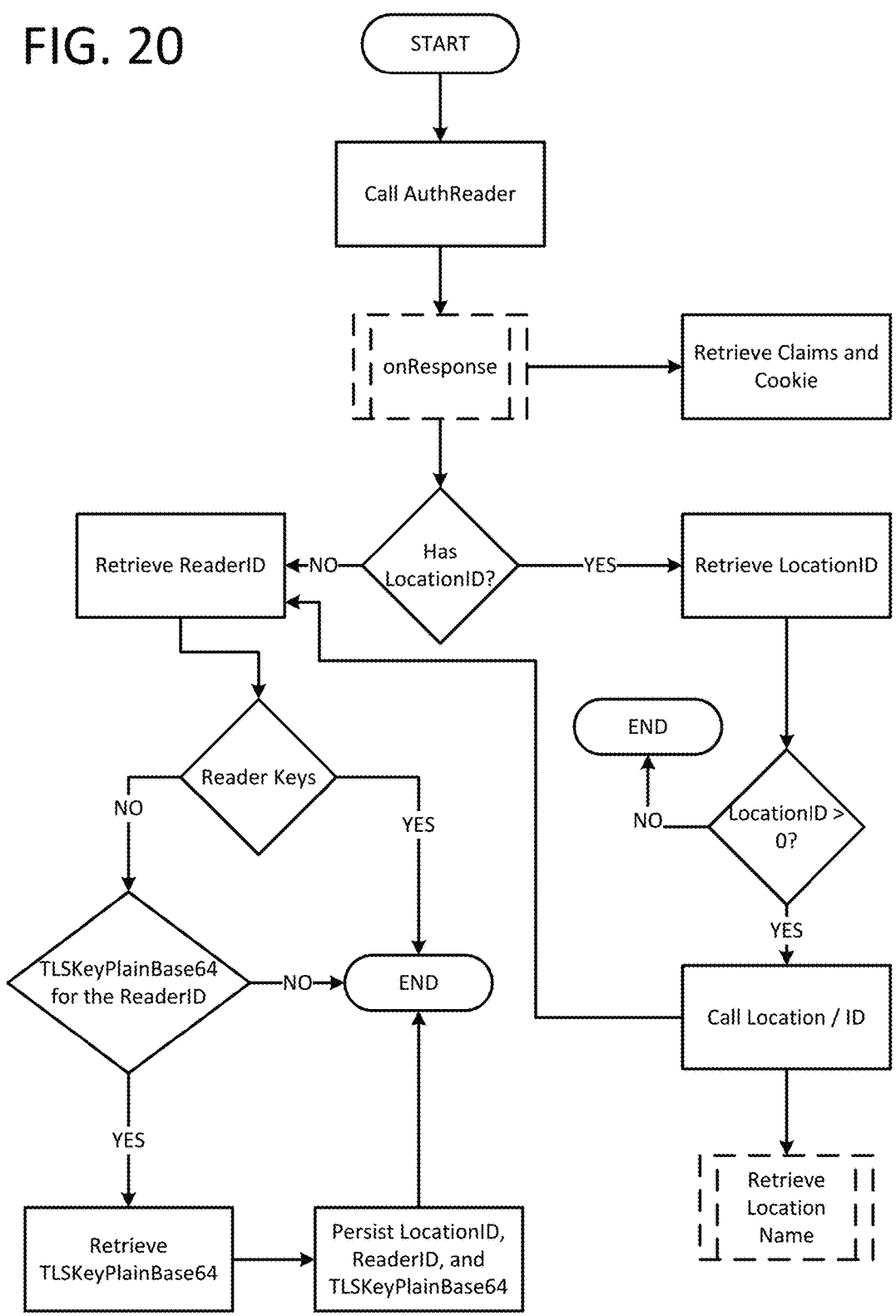
FIG. 20 illustrates a flowchart of an exemplary process of adding a device to an event according to an embodiment.

FIG. 20 illustrates a flowchart of an exemplary process of adding a device to an event. The process utilizes the reader identifier (e.g., ReaderID), a transport layer security property (e.g., TLSKeyPlainBase64), and claims and cookies. In an embodiment a location identifier (e.g., LocationID) is optional because a location may not be configured for the device. If the device does have a configured location, the process will request the location name.

Figure 21:
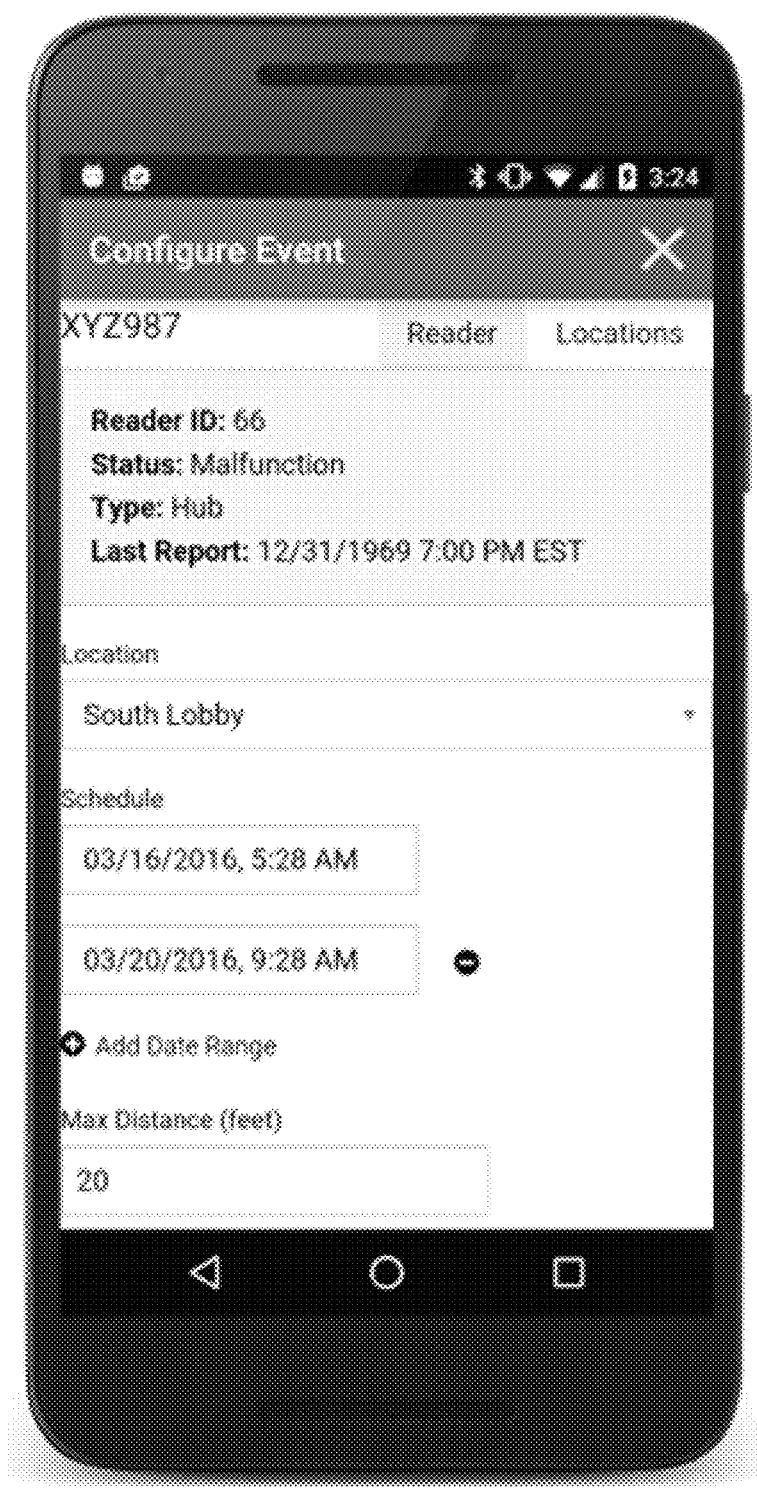
FIGS. 21-23 illustrate exemplary screenshots of the beacon tracking application according to an embodiment.

FIG. 21 illustrates an exemplary screenshot of a Configure Event screen. In an embodiment, the device displays the Configure Event screen after selecting the "Add to Event" button and successfully entering all of the required information. In an embodiment, the Configure Event screen is a web portal website wrapped in Android WebView control. The rendering of the Configure Event screen may depend on the device on which it is displayed.

Figure 22:

FIG. 22 illustrates an exemplary embodiment of the home screen. The home screen may include location and schedules when configured in the Configure Event screen. The home screen includes two control buttons near the bottom of the screen. In an embodiment, these buttons may be hidden by default and then displayed after a single click selection on the screen. The buttons include a "Remove Event" button that removes the event from the device and a "Configure Event" button that causes the application to display the Configure Event screen.

Figure 23:

FIG. 23 illustrates an exemplary embodiment of the home screen when the hub is on. In an embodiment, the hub turns on automatically when it has a location and it has schedules and supposes to be on. The hub may be turned off automatically or manually. In an embodiment, the application includes protections on removing or configuring an event. The application 310 includes schedulers running in the background, as described below in Table 3.

TABLE 3

| Scheduler | Off When | On When | Interval |
| --- | --- | --- | --- |
| Persist to Database Scheduler | Hub off | Hub on | 15 seconds |
| Upload to Server Scheduler | Hub off | Hub on | 60 seconds |
| Check Hub Schedule Scheduler | No event/when configure event | Event set/back from configure event | 60 seconds |
| Download Hub Configuration Scheduler | No event | Event set | 300 seconds |

The application 310 stores ranged beacon information in a computer-readable storage media (e.g., memory 304). In an embodiment, every 15 seconds Persist to Database Scheduler wakes up and saves them to a database. In another embodiment, a ReaderLogService intent service is used to persist beacon information to a database and to upload to a server. ReaderLogService acts as a queue. In yet another embodiment, Upload to Server Scheduler wakes up every 60 seconds and starts ReaderLogService to upload beacon information in the database to the server. For example, ReaderLogService may upload one thousand samples at a time. After successful upload, ReaderLogService deletes the uploaded samples in the database.

Figure 24:
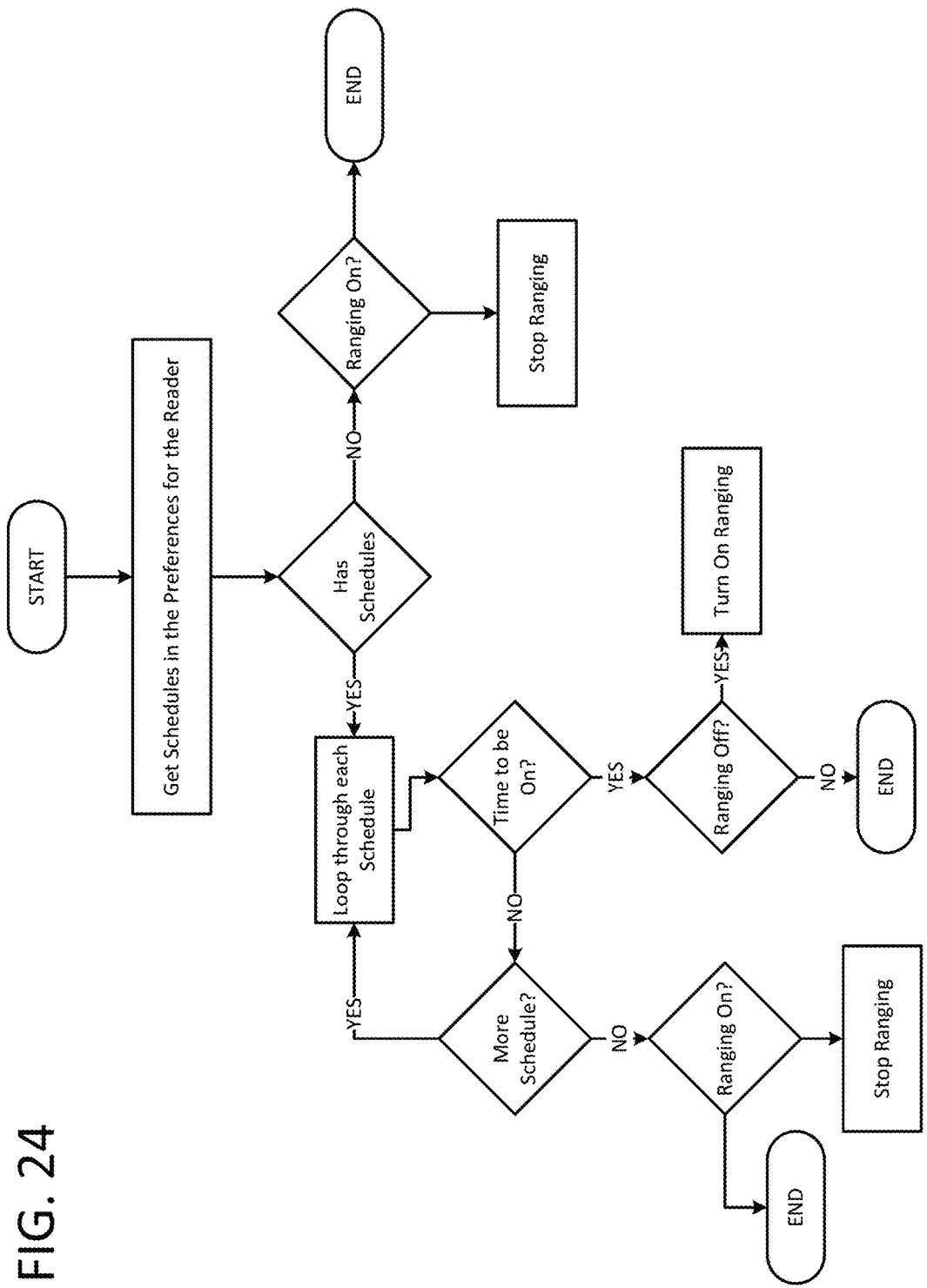
FIG. 24 illustrates a flowchart of an exemplary process of determining whether a hub should be on or off according to an embodiment.

FIG. 24 illustrates a flowchart of an exemplary process in which application 310 checks whether the hub should be on or off. In an embodiment, Check Hub Schedule Scheduler wakes up every 60 seconds to check if the hub should be on or off. In another embodiment, the hub will turn on ranging if and only if there is a schedule which is set for the current time. In yet another embodiment, Download Hub Configuration Scheduler wakes up every 300 seconds to download the latest schedules.

Figure 25:
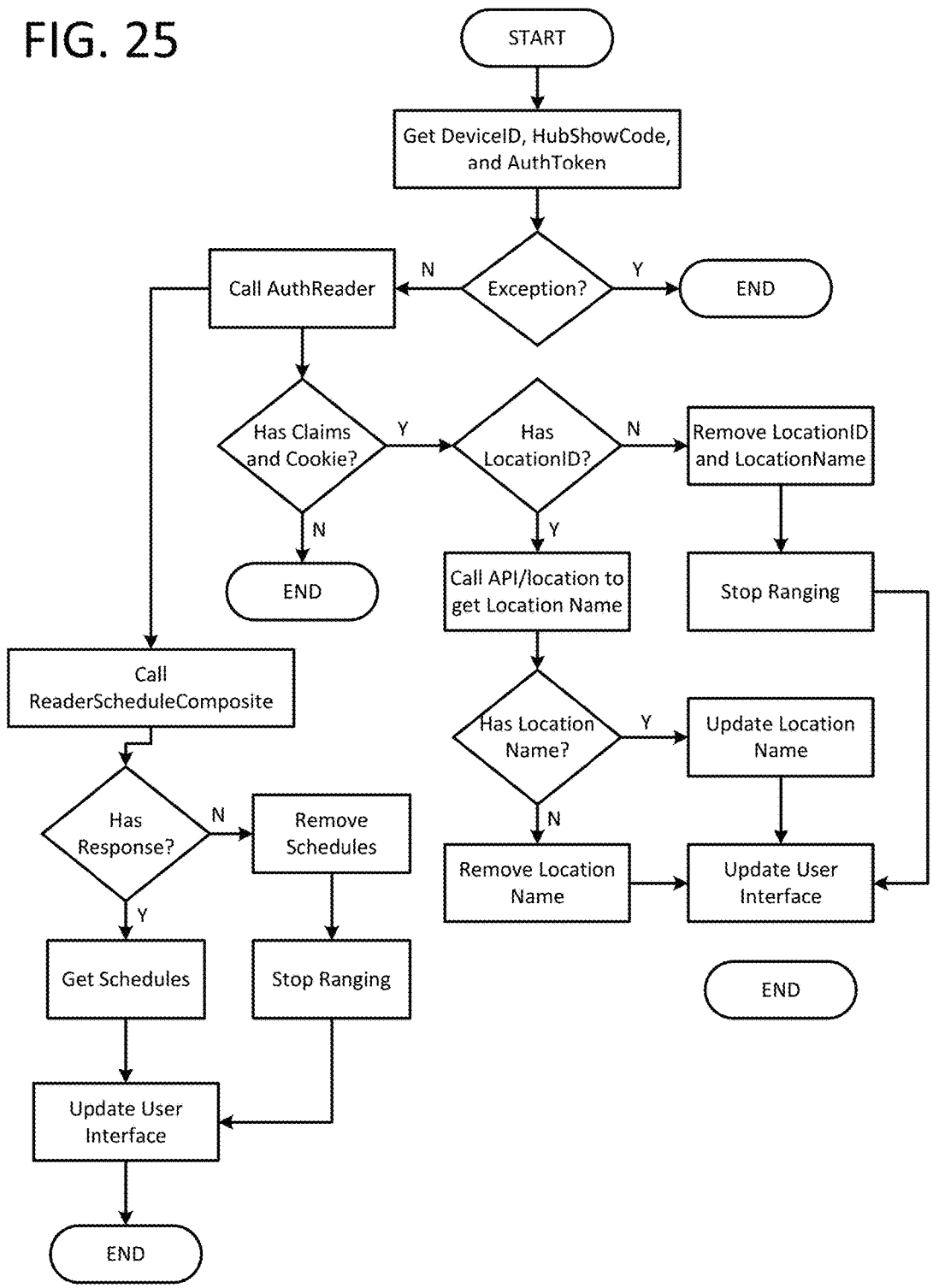
FIG. 25 illustrates a flowchart of an exemplary process in which a scheduler wakes up to refresh certain values according to an embodiment.

FIG. 25 illustrates a flowchart of an exemplary process in which Download Hub Configuration Scheduler wakes up every 300 seconds to refresh authentication claims and cookies, LocationID, and schedules.

In an embodiment, protocol buffers are used to upload beacon data. For example, application 310 may use a Wire library available from Square. A device operation iOS may use protobuf-swift available from alexeyxo. Appendix C of U.S. Provisional Patent Application Ser. Nos. 62/428,214 and 62/466,214, incorporated by reference above, includes an exemplary message definition in accordance with an aspect of the disclosure.

A user may remove an event by single clicking on the home screen and then selecting a "Remove Event" button. Selecting "Remove Event" will disable ranging if it's on, clear preferences such as reader ID and authentications, delete log database, and set hub status to "no event." In an embodiment, an event cannot be removed if there are unsynchronized beacon data. If the hub cannot synchronize, an alert dialog (not shown) is displayed on the screen.

A system in accordance with an aspect of the disclosure includes a badge (e.g., badge 102), a beacon (e.g., beacon 104), a plurality of mobile computing devices (e.g., mobile computing devices 108), and a server computing device (e.g., server computing device 110). The badge is configured to be worn by an event attendee and the beacon is integrated into the badge. The beacon is configured to emit an electromagnetic radiation signal (e.g., Bluetooth low energy) that includes a unique identifier that identifies the event attendee associated with the beacon. The mobile computing devices are distributed throughout an event area (e.g., event area 114) and each is configured to receive the electromagnetic radiation signal emitted by the beacon when the beacon is proximate to (e.g., immediate area 502, near area 504, far area 506, etc.) each device. Each mobile computing device is associated with a reader identifier that identifies the mobile computing device. And each mobile computing device executes an application (e.g., real-time beacon tracking application 310) that configures it to extract the unique identifier from the received electromagnetic radiation signal and generate location and time data representing the location of the badge relative to the location of the mobile computing device. The server computing device is communicatively coupled to the mobile computing devices via a communications network and a processor of the server computing device is configured to receive the extracted unique identifier, the generated location and time data, and the reader identifier from the mobile computing devices via the communications network. The processor of the server computing device is configured to store the received data in a computer-readable storage device as behavioral data representing the location of the badge throughout the event area during a period of time.

A method in accordance with another aspect of the disclosure enables tracking an attendee beacon (e.g., beacon 104) throughout an event area (e.g., event area 114). The method includes providing a name badge (e.g., badge 102) to an attendee. The name badge includes the beacon, which is configured to emit an electromagnetic signal that includes a unique identifier identifying the attendee. A mobile computing device (e.g., mobile computing device 108) receives the electromagnetic signal emitted by the beacon when the beacon is proximate (e.g., within at least one of a far area 506, a near area 504, and an immediate area 502) the mobile computing device. An application (e.g., real-time beacon tracking application 310) executing on the mobile computing device extracts the unique identifier from the received electromagnetic signal. The executing application generates location and time data representing the location of the beacon relative to the location of the mobile computing device. The unique identifier and the location and time data is transmitted from the mobile computing device to a server computing device (e.g., server computing device 110) that is communicatively coupled to the mobile computing device via a communications network. The server computing device transforms the unique identifier and the location and time data into behavioral data representing the location of the beacon throughout the event area during a period of time.

In another aspect, a computer-readable storage device (e.g., memory 304) stores computer-executable instructions that, when executed by a processor (e.g., processor 302), track a beacon (e.g., beacon 104) throughout an event area (e.g., event area 114). Included are instructions for receiving an electromagnetic signal emitted by the beacon when the beacon is proximate (e.g., within at least one of a far area 506, a near area 504, and an immediate area 502) the computer-readable storage device. The beacon is affixed to a name badge (e.g., badge 102) associated with the attendee and the electromagnetic signal includes an identification component uniquely identifying the attendee. Also included are instructions for extracting the identification component from the received electromagnetic signal and for generating location and time data representing the location of the beacon relative to the location of the computer-readable storage device in the event area. And the instructions include those for transmitting the identification component and the location and time data from the computer-readable storage device to a server computing device (e.g., server computing device 110) via a communications network. The server computing device is configured to transform the identification component and the location and time data into behavioral data representing the location of the beacon throughout the event area during a period of time.

Another system in accordance with an aspect of the disclosure includes a plurality of beacons (e.g., beacons 104), a plurality of hubs (e.g., hubs 106), and a plurality of exhibitor mobile computing devices (e.g., mobile computing devices 108). The beacons are each associated with an event attendee and configured to be worn by the associated event attendee. Each beacon is also configured to emit a unique identifier identifying the associated event attendee. Each hub is associated with a common area (e.g., lobby, etc.) of an event area (e.g., event area 114). Each hub includes a mobile computing device (e.g., mobile computing device 108), at least two batteries to provide electrical power to the mobile computing device, and a housing enclosing the mobile computing device and the batteries. The exhibitor mobile computing devices are different from the mobile computing devices of the hubs and each associated with one of a plurality of event exhibitors. The exhibitor mobile computing devices are distributed throughout the event area. The mobile computing device of each hub and each exhibitor mobile computing device is configured to receive the unique identifier emitted by the beacons proximate thereto. The mobile computing device of each hub and each exhibitor mobile computing device execute an application (e.g., real-time beacon tracking application 310) that configures the device to generate location and time data representing the locations of the beacons relative thereto. The applications executing on the mobile computing device of each hub and each exhibitor mobile computing device configure the device to transmit the unique identifiers and the location and time data to a server computing device (e.g., server computing device 110) for transformation into behavioral data representing the locations of the beacons throughout the event area during a period of time.

In yet another aspect, a wearable identifier includes a receptacle (e.g., badge 102) for a name label and a beacon (e.g., beacon 104) integrally connected to the receptacle. The name label includes text printed on it that identifies an event attendee. The beacon is configured to emit an electromagnetic signal that includes a unique identifier associated with the text identifying the event attendee. In one form, the name label includes at least one of a bar code and a quick response (QR) code printed on it.

In accordance with one or more aspects of disclosure, the systems and processes described herein provide the following benefits.

Existing lead retrieval software executing on mobile computing devices of exhibitors (and already in use for lead retrieval purposes) becomes a location receiver. Tradeshows and the like (e.g., B2B tradeshows) are designed for the purpose of maximizing interactions between exhibiting companies and potential buyers/customers. A fundamental aspect of the tradeshow is the collection of attendee contact information by the exhibitor of attendees that have interest in their respective products and/or services. This exchange of information is referred to as a lead, in an embodiment. Conventional techniques automate this information exchange through the use of electronic media and technology known within the industry as Lead Retrieval systems. Lead retrieval systems are a basic business system deployed by exhibiting companies to collect, qualify, filter, and/or contact business lead information that was exchanged face-to-face during the tradeshow. Aspects of the present invention leverage this existing network of computing devices (e.g., smartphones, tablet computing devices, etc.), which are conventionally deployed for lead retrieval purposes, as electromagnetic radiation signal (e.g., Bluetooth low energy signal) receivers. Leveraging this adjacent and pre-existing network of software and computing devices decreases need for additional hardware and deployment times, and increases exhibitor participation rates.

Through processor-executable instructions on the server computing device we can determine not only point of presence in time but duration of stay of an attendee wearing an associated beacon in a specific area.

The ability to inter-join both attendee location behavioral data with demographic registration data to provide group behavioral analysis. In an embodiment, aspects of the present invention (e.g., real-time beacon tracking application 310, software applications executing on server computing device 110 and/or cloud computing environment 116, etc.) utilize attendee answers to demographic questions to calculate aggregated and/or averaged behavioral metrics for types of peoples and/or personas. For example, this grouping of behavioral data can be utilized by event organizers to better understand behaviors of masses of people, drive marketing campaign strategies, and/or drive future event design and content decisions.

The ability to inter-join both attendee location behavioral data with exhibitor lead retrieval data to provide group behavioral analysis for exhibitors. In an embodiment, exhibitors benefit from the analysis of attendee personas and/or groups based on common demographic answers to reveal contextual metrics regarding the quality and types of exhibit space traffic.

The ability to provide value-add qualification intelligence to exhibitors for the attendees in which they captured lead transactions. Due to the system utilizing the pre-existing lead retrieval system hardware and software, the lead data is combined with the behavior duration data to further qualify leads based on number of visits and/or total time spent within an exhibitor's exhibit space, in accordance with one or more embodiments.

The ability to provide the function to customers in which to use software loaded on their personal mobile computing devices to become mobile receivers to instantly capture proximity attendance anywhere they choose at any time. Existing lead retrieval systems are deployed both through proprietary hardware devices and mobile application software. Aspects of the present invention include software that enables exhibitor's personal mobile computing devices (e.g., smartphones, etc.) to become mobile receivers to capture proximity data. This provides both a level of convenience and scalability for exhibitors and in particular large exhibitors with high numbers of booth personnel.

The ability to incorporate image capture technology inherent in the mobile computing devices in conjunction with beacon reads to provide visual representation of the read area. In an embodiment, receiver hardware (e.g., mobile computing devices 108) includes the ability to capture image data (e.g., via a camera) to enhance proximity read data with visual image data. This data is used by event organizers to confirm proximity reads as well as to review attendee behavioral patterns in accordance with one or more embodiments.

The ability to provide exhibitors the capability of utilizing software on their mobile computing devices to get an instant look at the names of companies represented by attendees proximate thereto in real time. In an embodiment, mobile computing devices 108 display the names of companies represented by attendees (e.g., beacons 104 associated with event attendees) that are proximate to the location of the mobile computing device in real time. For instance, this view of attendees in or nearby their exhibit booth allows exhibitors to quickly assess if high-value business contacts are in or around the booth and target those individuals for face-to-face contact.

The ability to leverage attendee behavioral data to provide behavior-based session, exhibitor, and attendee networking recommendations. In an embodiment, attendees experience value from aspects of the present invention by receiving (e.g., on their mobile computing devices) recommendations for additional sessions that align with their interests, exhibitors that provide services/products of interest, and/or other attendees that may provide valuable networking connections, all based upon interests that are based upon an analysis of behaviors presented during the event.

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of tracking attendee beacons throughout an event area, comprising:
    providing a plurality of name badges to a plurality of attendees, wherein the name badges include a beacon configured to emit a unique identifier identifying the associated event attendee;
    providing a plurality of hubs each associated with a common area of an event area, the hubs each comprising:
        a mobile computing device,
        at least two batteries to provide electrical power to the mobile computing device, and
        a housing enclosing the mobile computing device and the at least two batteries;
    providing a plurality of exhibitor mobile computing devices each associated with one of a plurality of event exhibitors, wherein the exhibitor mobile computing devices are distributed throughout the event area,
    receiving, by the mobile computing device of each hub and each exhibitor mobile computing device, the unique identifier emitted by the beacons when the beacons are proximate thereto;
    generating, by an application executing on the mobile computing device of each hub and each exhibitor mobile computing device, location and time data representing the location of the beacons relative thereto;
    transmitting, by an application executing on the mobile computing device of each hub and each exhibitor mobile computing device, the unique identifier and the location and time data to a server computing device; and
    transforming, by an application executing on the server computing device, the unique identifier and the location and time data into behavioral data representing the location of the beacons throughout the event area during a period of time.

2. The method of claim 1, wherein the beacons are each configured to emit the unique identifier identifying the associated event attendee in accordance with a Bluetooth low energy protocol, wherein the unique identifier includes a major value, and wherein the unique identifier includes a minor value randomly assigned to the beacon.

3. The method of claim 1, further comprising transmitting, by the mobile computing device, a wakeup signal configured to reset a ranging counter in another mobile computing device upon reception of the wakeup signal by the another mobile computing device.

4. The method of claim 1, further comprising resetting, by at least a first mobile computing device, a ranging counter in response to at least one beacon entering and exiting a subset of the event area proximate to the first mobile computing device.

5. The method of claim 1, further comprising:
    receiving from the server computing device in response to said transforming, by a user computing device associated with a beacon, a current location of the beacon within the event area; and
    displaying, by the user computing device, the current location of the beacon within the event area in response to said receiving.

6. The method of claim 5, further comprising displaying, by the user computing device, navigation instructions from the current location of the beacon to at least one of the exhibitor mobile computing devices distributed throughout the event area.

7. A system, comprising:
    a plurality of beacons each associated with one of a plurality of event attendees, wherein each beacon is configured to be worn by the associated event attendee, and wherein each beacon is configured to emit a unique identifier identifying the associated event attendee;

a plurality of hubs each associated with a common area of an event area, the hubs each comprising:
a mobile computing device,
at least two batteries to provide electrical power to the mobile computing device, and
a housing enclosing the mobile computing device and the at least two batteries; and
a plurality of exhibitor mobile computing devices each associated with one of a plurality of event exhibitors, wherein the exhibitor mobile computing devices are distributed throughout the event area,
wherein the mobile computing device of each hub and each exhibitor mobile computing device is configured to receive the unique identifier emitted by the beacons proximate thereto,
wherein the mobile computing device of each hub and each exhibitor mobile computing device is configured, by an application executing thereon, to generate location and time data representing the locations of the beacons relative thereto, and
wherein the mobile computing device of each hub and each exhibitor mobile computing device is configured, by an application executing thereon, to transmit the unique identifiers and the location and time data to a server computing device for transformation into behavioral data representing the locations of the beacons throughout the event area during a period of time.

8. The system of claim 7, wherein the unique identifier identifying the associated event attendee includes a major value of between 1 and 10 and a minor value of between 1 and 65,535, and wherein the minor value is randomly assigned to the beacon.

9. The system of claim 7, wherein at least a first mobile computing device of the plurality is configured, by an Android operating system executing thereon, to transmit a wakeup signal, and wherein at least a second mobile computing device of the plurality is configured, by an iOS operating system executing thereon, to receive the wakeup signal and reset a Bluetooth ranging counter in response to said receiving.

10. The system of claim 7, wherein the badge includes at least one of a bar code and a quick response (QR) code, and wherein each mobile computing device is configured to scan the at least one of the bar code and the QR code and associate it with the unique identifier identifying the associated event attendee.

11. The system of claim 7, wherein at least a first mobile computing device of the plurality is configured, by an iOS operating system executing thereon, to reset a Bluetooth ranging counter in response to the beacon entering and exiting a subset of the event area proximate to the first mobile computing device.

12. The system of claim 7, wherein the plurality of beacons are each configured to emit the unique identifiers in accordance with a Bluetooth low energy protocol.

13. The system of claim 7, wherein the mobile computing device of at least a first hub of the plurality and at least a first exhibitor mobile computing device of the plurality are configured to emit a wakeup signal, and wherein at least a second exhibitor mobile computing device of the plurality is configured to receive the wakeup signal and reset a ranging counter in response to said receiving.

14. The system of claim 7, wherein at least a first exhibitor mobile computing device of the plurality is configured to reset a ranging counter in response to at least one beacon of the plurality entering and exiting a subset of the event area proximate to the first mobile computing device.

15. The system of claim 7, further comprising a plurality of user computing devices each associated with one of the plurality of event attendees, wherein the user computing devices are configured, by an application executing thereon, to display a current location of the event attendee associated therewith in the event area.

16. The system of claim 15, wherein the user computing devices are configured, by the application executing thereon, to display navigation instructions from the current location of the event attendee to at least one of the exhibitor mobile computing devices distributed throughout the event area.

17. The system of claim 7, wherein each beacon is integrated into a badge configured to be worn by an event attendee.

18. The system of claim 17, wherein the beacon is configured to emit the unique identifier identifying the associated event attendee in accordance with a Bluetooth low energy protocol.

19. The system of claim 17, further comprising a user computing device associated with the event attendee, wherein the user computing device is configured, by an application executing thereon, to display a current location of the event attendee in the event area.

20. The system of claim 19, wherein the user computing device is configured, by the application executing thereon, to display navigation instructions from the current location of the event attendee to at least one of the mobile computing devices distributed throughout the event area.

* * * * *